United States Patent [19]
Kinugasa et al.

[11] Patent Number: 6,119,452
[45] Date of Patent: Sep. 19, 2000

[54] DEVICE FOR PURIFYING EXHAUST GAS OF INTERNAL COMBUSTION ENGINE

[75] Inventors: Yukio Kinugasa; Kouhei Igarashi, both of Susono; Takaaki Itou, Mishima; Naoto Suzuki, Susono; Takehisa Yaegashi, Mishima; Toshiaki Tanaka, Numazu; Naoto Miyoshi, Nagoya, all of Japan

[73] Assignee: Toyota Jidosha Kabushiki Kaisha, Toyota, Japan

[21] Appl. No.: 09/068,684
[22] PCT Filed: Nov. 8, 1996
[86] PCT No.: PCT/JP96/03288
§ 371 Date: May 13, 1998
§ 102(e) Date: May 13, 1998
[87] PCT Pub. No.: WO97/19261
PCT Pub. Date: May 29, 1997

[30] Foreign Application Priority Data

Nov. 17, 1995 [JP] Japan .................................. 7-299935

[51] Int. Cl.[7] .................................................. F01N 3/00
[52] U.S. Cl. ............................ 60/285; 60/295; 60/297; 60/301; 60/286; 123/443
[58] Field of Search ................ 60/285, 276, 297, 60/301, 286; 123/295, 443

[56] References Cited

U.S. PATENT DOCUMENTS

| | | |
|---|---|---|
| 4,895,875 | 1/1990 | Virk . |
| 5,056,308 | 10/1991 | Kume et al. .......................... 60/276 |
| 5,207,058 | 5/1993 | Sasaki et al. . |
| 5,410,873 | 5/1995 | Tashiro . |
| 5,461,857 | 10/1995 | Itou et al. . |
| 5,479,775 | 1/1996 | Kraemer et al. . |
| 5,657,625 | 8/1997 | Koga et al. ............................ 60/274 |
| 5,661,971 | 9/1997 | Waschatz et al. . |
| 5,740,669 | 4/1998 | Kinugasa et al. . |
| 5,746,052 | 5/1998 | Kinugasa et al. . |
| 5,778,667 | 7/1998 | Kinugasa et al. ..................... 60/274 |
| 5,782,087 | 7/1998 | Kinugasa et al. . |
| 5,826,425 | 10/1998 | Sebastiano et al. . |

FOREIGN PATENT DOCUMENTS

| | | |
|---|---|---|
| 4-365920 | 12/1992 | Japan . |
| 93/07363 | 4/1993 | Japan . |
| 5-131118 | 5/1993 | Japan . |
| 6-10725 | 1/1994 | Japan . |
| 6-173660 | 6/1994 | Japan . |
| 7-54697 | 2/1995 | Japan . |
| 70185344 | 7/1995 | Japan . |
| 7-238852 | 9/1995 | Japan . |
| 7-310534 | 11/1995 | Japan . |
| 8-4522 | 1/1996 | Japan . |

OTHER PUBLICATIONS

Japanese Publication No. 6–330741, Nov. 29, 1994.
Japanese Publication No. 6–108827 Apr. 19, 1994.
U.S. Ser. No. 259,751, Jun. 10, 1994, Copending Application
U.S. Ser. No. 344,768, Nov. 23, 1994, Copending Application.
U.S. Ser. No. 525,892, Sep. 8, 1995, Copending Application.
U.S. Ser. No. 590,714, Jan. 24, 1996, Copending Application.

*Primary Examiner*—Thomas Denion
*Assistant Examiner*—Binh Tran
*Attorney, Agent, or Firm*—Kenyon & Kenyon

[57] ABSTRACT

A three-way catalyst (8a) is connected to a first cylinder group 1a. The exhaust gas of the first cylinder group (1a), which has passed through the three-way catalyst (8a), and the exhaust gas of a second cylinder group (1b) are introduced to an exhaust gas purifying catalyst (14). The second cylinder group (1b) performs the lean operation. The first cylinder group (1a) performs the rich operation to synthesize $NH_3$ from $NO_X$ in the exhaust gas of the first cylinder group (1a) in the three-way catalyst (8a). In the exhaust gas purifying catalyst (14), $NO_X$ in the exhaust gas of the second cylinder group 1b is purified by $NH_3$ from the three-way catalyst (8a). The amount of HC flowing to the three-way catalyst (8a) is obtained. When the HC amount exceeds a predetermined amount, the first cylinder group 1a must perform the lean operation temporarily, to thereby maintain the excellent catalytic activity of the three-way catalyst (8a).

13 Claims, 12 Drawing Sheets

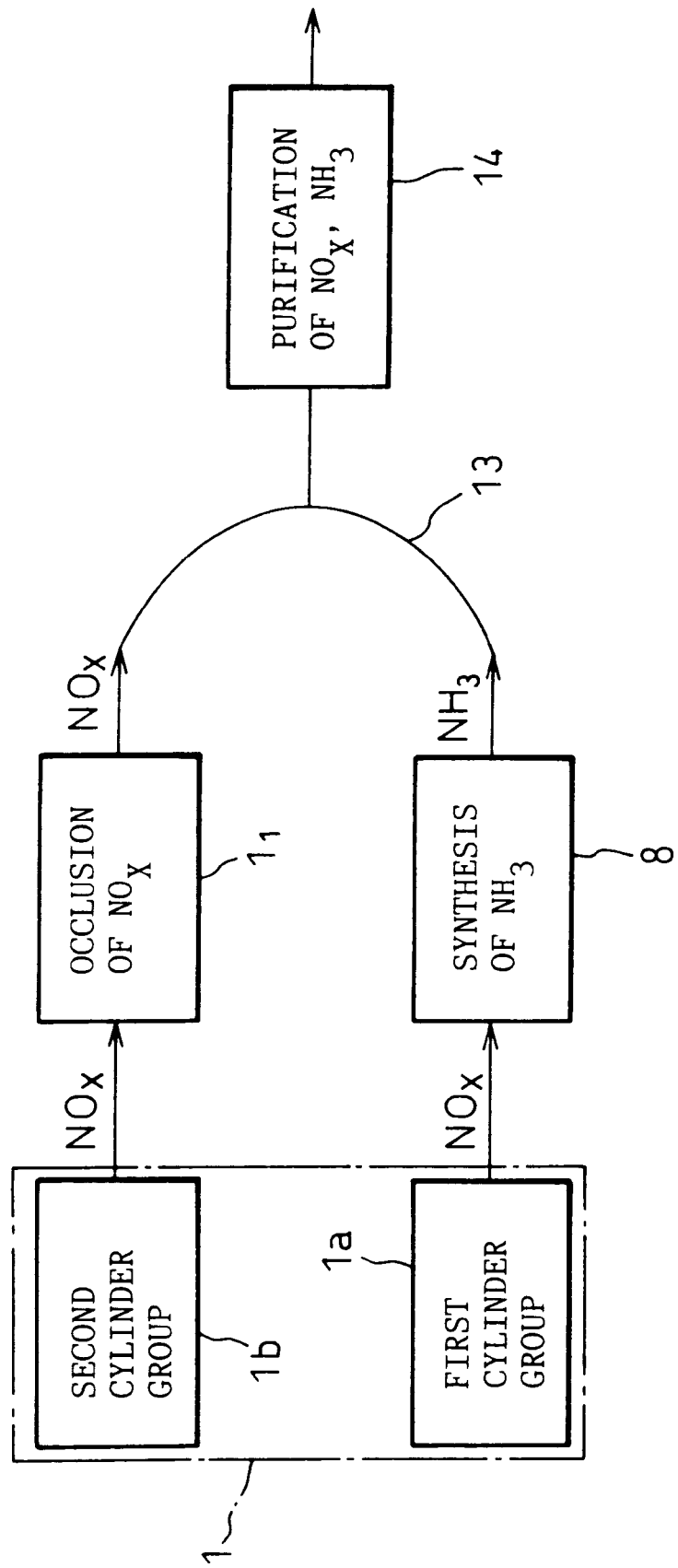

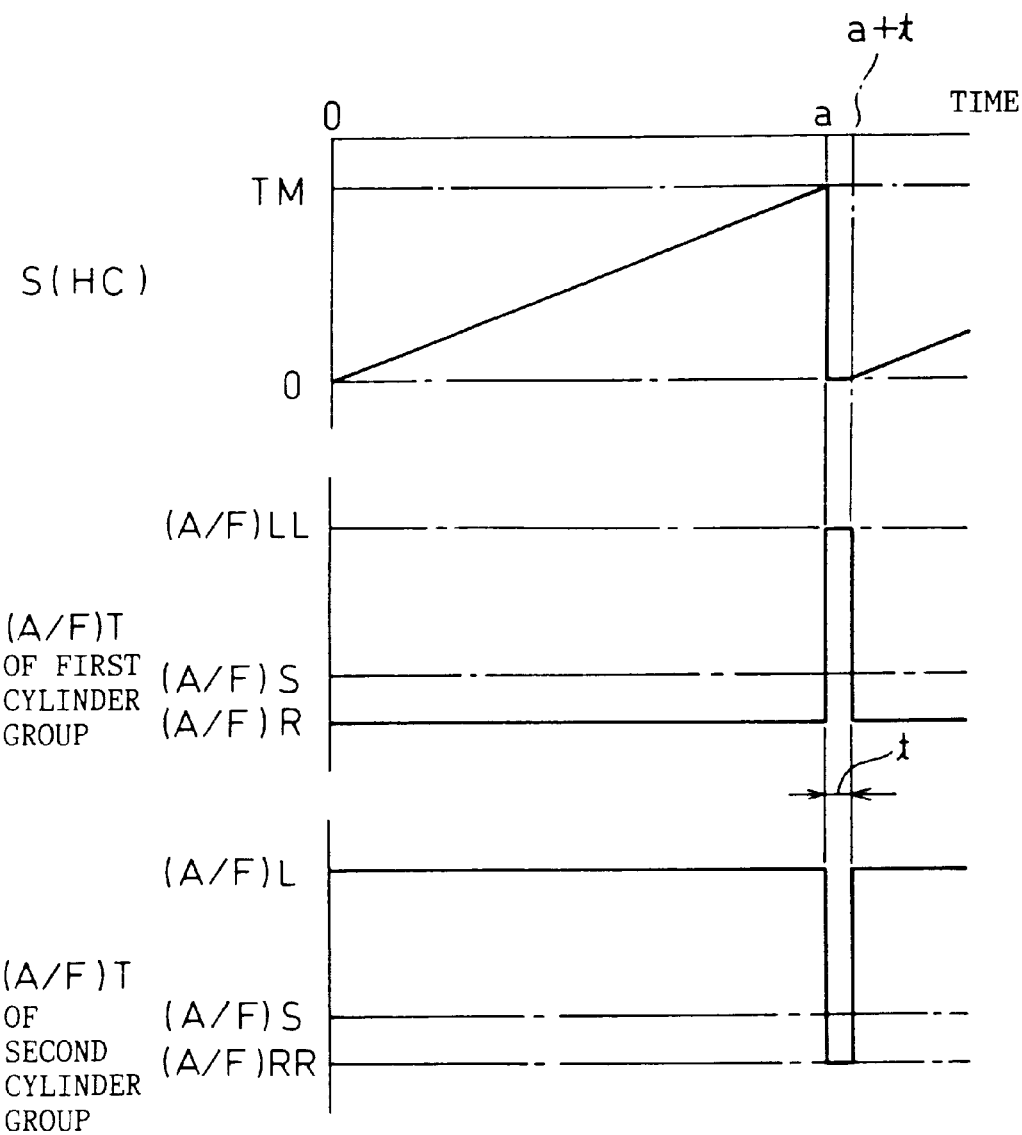

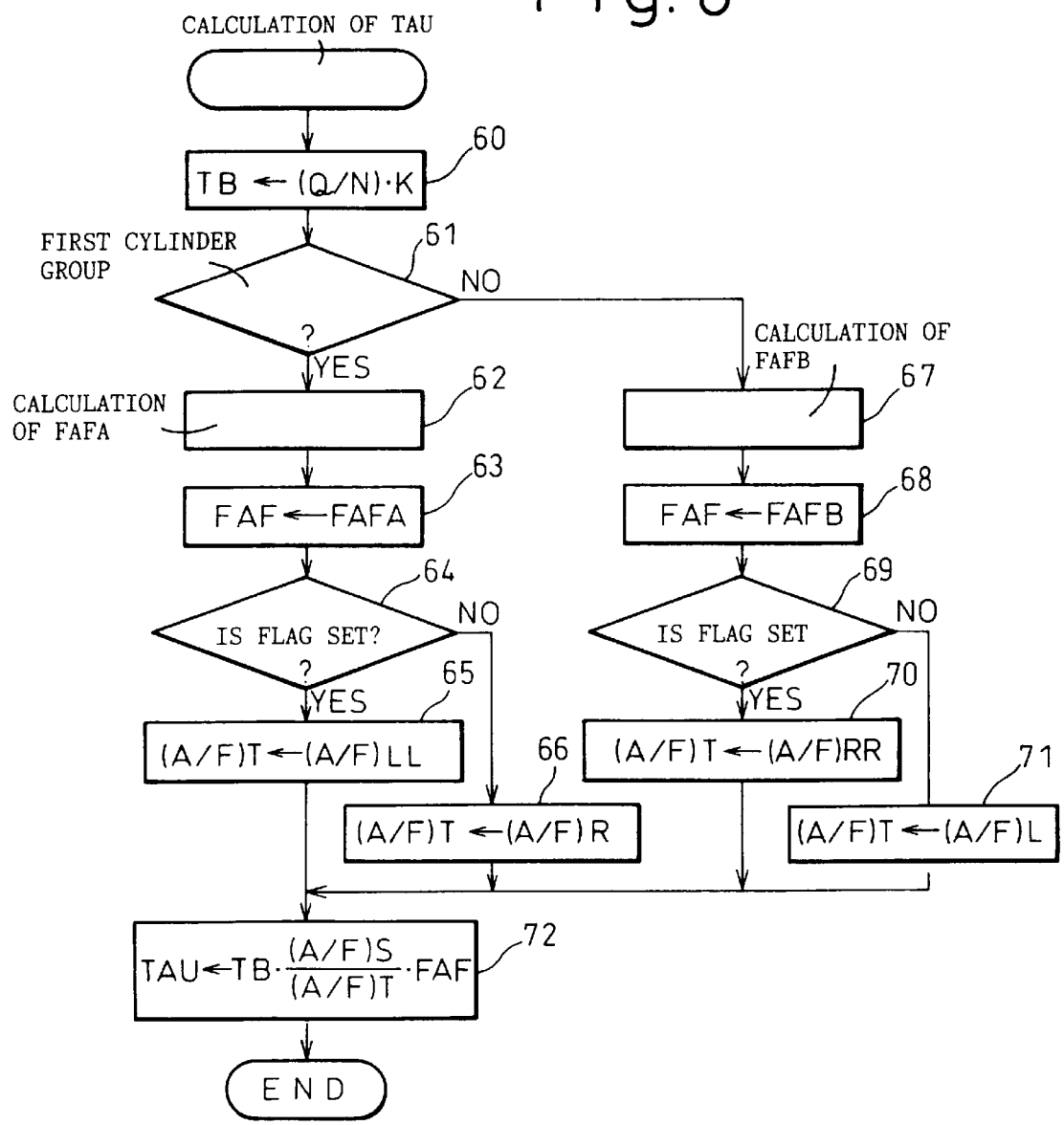

DEVICE FOR PURIFYING EXHAUST GAS OF INTERNAL COMBUSTION ENGINE

TECHNICAL FIELD

The present invention relates to a device for purifying an exhaust gas of an internal combustion engine.

BACKGROUND ART

Japanese Unexamined Patent Publication No. 4-365920 discloses a device for purifying an exhaust gas of an internal combustion engine having a plurality of cylinders divided into first and second cylinder groups, in which the device includes an $NH_3$ synthesizing catalyst arranged in a first exhaust passage which is connected to the first cylinder group, the $NH_3$ synthesizing catalyst synthesizing ammonia $NH_3$ from nitrogen oxide $NO_X$ in the inflowing exhaust gas when the exhaust gas air-fuel ratio of the inflowing exhaust gas is rich, and an interconnecting exhaust passage interconnecting the first passage downstream of the $NH_3$ synthesizing catalyst and a second exhaust passage which is connected to the second cylinder group, wherein the first cylinder group performs a rich operation to supply $NH_3$ to the interconnecting passage to thereby reduce $NO_X$ in the exhaust gas exhausted from the second cylinder group which performs a lean operation, using the $NH_3$. In the device, while the rate of fuel consumption of the engine is made as low as possible by increasing the number of cylinders composing the second cylinder group, $NO_X$ produced by the second cylinder group is purified by $NH_3$ so that the amount of $NO_X$ discharged into the ambient air is reduced as much as possible.

The $NH_3$ synthesizing catalyst described above may be comprised of a three-way catalyst which includes a precious metal such as palladium Pd, platinum Pt, or rhodium Rh. However, when the $NH_3$ synthesizing catalyst is composed of the above mentioned three-way catalyst, if the exhaust gas air-fuel ratio of the exhaust gas flowing to the $NH_3$ synthesizing catalyst is kept rich for a long time, i.e., if the $NH_3$ synthesizing catalyst is kept contact with the exhaust gas of which the exhaust gas air-fuel ratio is rich, the catalytic activity of the $NH_3$ synthesizing catalyst is relatively easily lost. As a result, $NH_3$ cannot be synthesized excellently, and thus $NO_X$ cannot be purified excellently.

DISCLOSURE OF THE INVENTION

The object of the present invention is to provide a device for purifying an exhaust gas which is able to maintain the excellent catalytic activity of the $NH_3$ synthesizing catalyst.

According to the present invention, there is provided a device for purifying an exhaust gas of an internal combustion engine having a plurality of cylinders divided into first and second cylinder groups, and first and second exhaust passages connected to the first and the second cylinder groups, respectively, the device comprising: an $NH_3$ synthesizing catalyst arranged in the first exhaust passage, the $NH_3$ synthesizing catalyst synthesizing $NH_3$ from at least of a part of $NO_X$ in the inflowing exhaust gas when the exhaust gas air-fuel ratio of the inflowing exhaust gas is rich; first making-rich means for making the exhaust gas air-fuel ratio of the exhaust gas flowing into the $NH_3$ synthesizing catalyst rich to synthesize $NH_3$; an interconnecting exhaust passage interconnecting the first passage downstream of the $NH_3$ synthesizing catalyst and the second exhaust passage to contact $NH_3$ synthesized in the $NH_3$ synthesizing catalyst and $NO_X$ from the second exhaust passage to each other, to reduce the $NO_X$ by the $NH_3$; and first making-lean means for making the exhaust gas air-fuel ratio of the exhaust gas flowing into the $NH_3$ synthesizing catalyst temporarily lean.

BRIEF DESCRIPTION OF THE DRAWINGS

FIG. 4 is a schematic illustration showing a concept of the basic exhaust gas purifying method of the present invention;

FIG. 6 is a timechart explaining the changes in a target air-fuel ratio;

FIG. 8 is a flowchart for calculating the fuel injection time;

BEST MODE FOR CARRYING OUT THE INVENTION

In general, nitrogen oxides $NO_X$ may include nitrogen monoxide NO, nitrogen dioxide $NO_2$, dinitrogen tetraoxide $N_2O_4$, dinitrogen monoxide $N_2O$, etc. While the following explanations are made referring to $NO_X$ mainly as nitrogen monoxide NO and nitrogen dioxide $NO_2$, a device for purifying an exhaust gas according to the present invention can also purify other nitrogen oxides.

Figure 1:
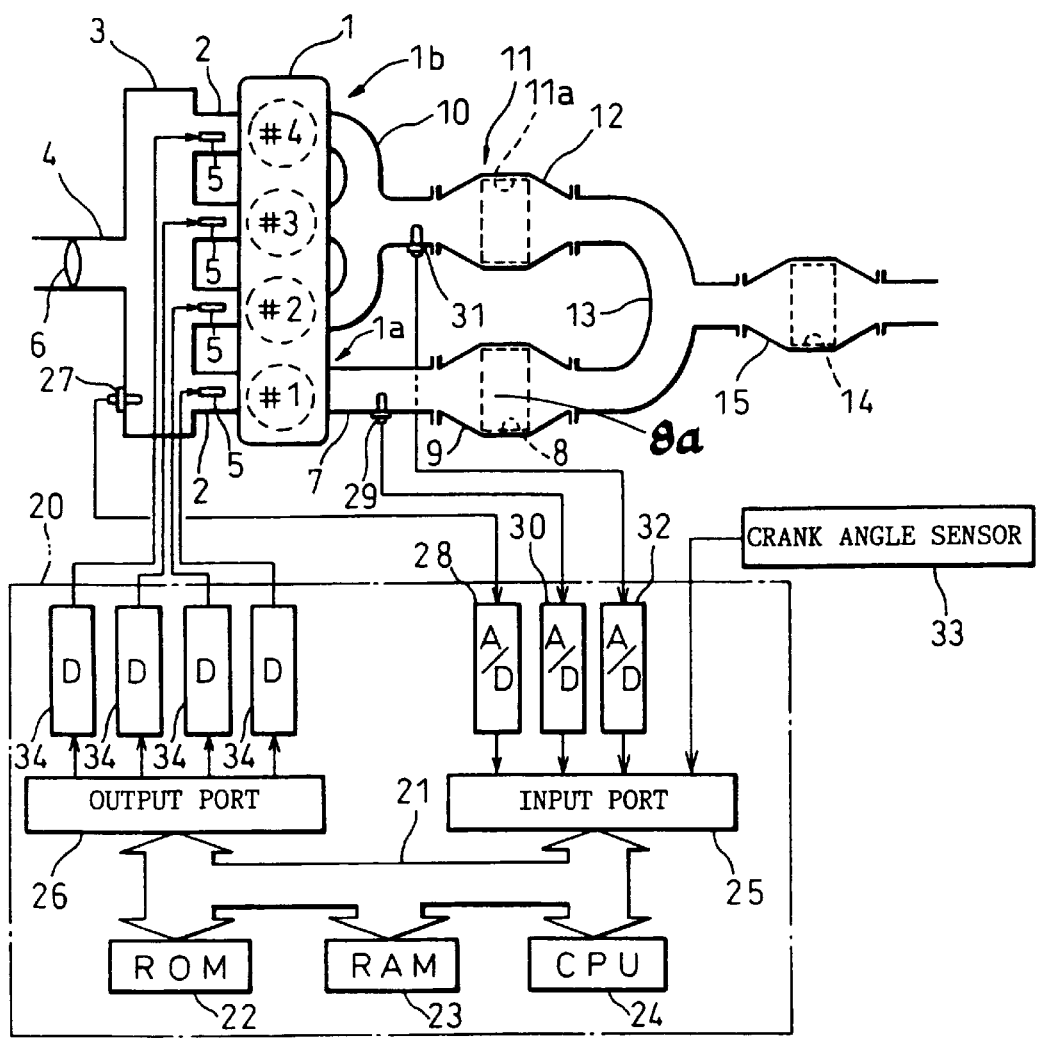
FIG. 1 is an overall view of an internal combustion engine.

Referring to FIG. 1, an engine body 1 for an automobile has four cylinders, i.e., a first cylinder #1, a second cylinder #2, a third cylinder #3, and a fourth cylinder #4. Each cylinder #1–#4 is connected to a common surge tank 3 via a corresponding intake branch 2, and the surge tank 3 is connected to an air cleaner (not shown) via an intake duct 4. In each intake branch 2, a fuel injector 5 is arranged to feed fuel to the corresponding cylinder. A throttle valve 6 is arranged in the intake duct 4, the opening of which becomes larger as the depression of an acceleration pedal (not shown) becomes larger. Note that the fuel injectors 5 are controlled in accordance with the output signals from an electronic control unit 20.

The first cylinder #1 is connected to a catalytic converter 9, in which an $NH_3$ synthesizing catalyst 8 is housed, via an exhaust pipe 7. On the other hand, the second cylinder #2, the third cylinder #3, and the fourth cylinder #4 are connected to a catalytic converter 12 in which an occlusive material 11 is housed, via a common exhaust manifold 10. In the engine shown in FIG. 1, the first cylinder #1 constitutes a first cylinder group 1a, and the second cylinder #2, the third cylinder #3, and the fourth cylinder #4 constitute a second cylinder group 1b. Accordingly, the exhaust gas discharged from the first cylinder group 1a is introduced to the $NH_3$ synthesizing catalyst 8, and the exhaust gas discharged from the second cylinder group 1b is introduced to the occlusive material 11. The catalytic converters 9 and 12 are connected to a catalytic converter 15, in which an exhaust gas purifying catalyst 14 is housed, via a common interconnecting exhaust pipe 13.

The electronic control unit 20 is composed of a digital computer, which includes a ROM (read only memory) 22, RAM (random access memory) 23, CPU (microprocessor) 24, input port 25 and output port 26, which are connected to each other via a bidirectional bus 21. A pressure sensor 27, which generates an output voltage proportional to the pressure in the surge tank 3, is attached to the surge tank 3. The output voltage of the pressure sensor 27 is input to the input port 25 via an AD converter 28. In the CPU 24, the amount of intake air is calculated in accordance with the output signal of the AD converter 28. An air-fuel ratio sensor 29, which generates an output voltage in accordance with an exhaust gas air-fuel ratio (described later) of the exhaust gas flowing through the exhaust pipe 7, is attached to the exhaust pipe 7. The output voltage of the air-fuel ratio sensor 29 is input to the input port 25 via an AD converter 30. In the collecting portion of the exhaust manifold 10, an air-fuel ratio sensor 31, which generates an output voltage in accordance with the exhaust gas air-fuel ratio of the exhaust gas flowing through the collecting portion of the exhaust manifold 10. The output voltage of the air-fuel ratio sensor 31 is input to the input port 25 via an AD converter 32. A crank angle sensor 33, which generates output pulses every the crank shaft rotates, for example, by 30 degree, is connected to the input port 25. By the CPU 24, the engine speed is calculated in accordance with these output pulses. On the other hand, the output port 26 is connected to each fuel injector 5 via a corresponding drive circuit 34.

In the embodiment shown in FIG. 1, the $NH_3$ synthesizing catalyst 8 is comprised of a three-way catalyst 8a. The three-way catalyst 8a is comprised of precious metals such as palladium Pd, platinum Pt, and rhodium Rh, carried on a wash coat layer of, for example, alumina, formed on the surface of the carrier.

Figure 2:
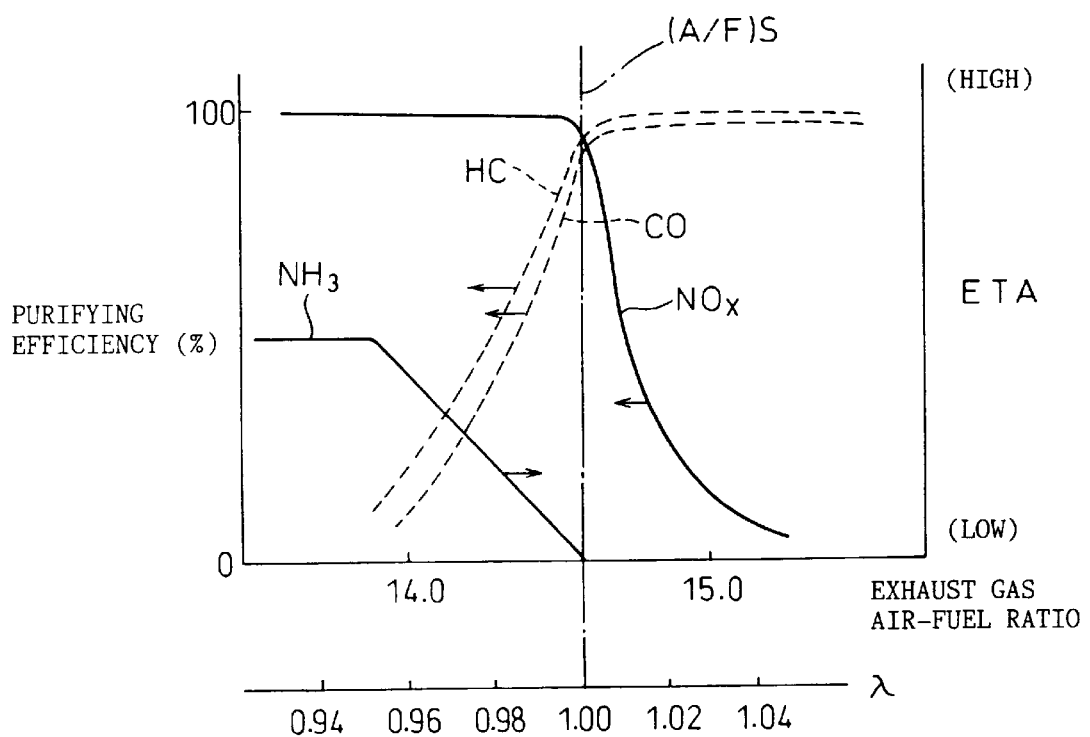
FIG. 2 is a diagram showing the characteristics of a three-way catalyst.

FIG. 2 illustrates the purifying efficiency of a three-way catalyst. If a ratio of the total amount of air fed into the intake passage, the combustion chamber, and the exhaust passage upstream of a certain position in the exhaust passage to the total amount of fuel fed into the intake passage, the combustion chamber, and the exhaust passage upstream of the above mentioned position, is referred to as an exhaust gas air-fuel ratio of the exhaust gas flowing through that position, the three-way catalyst 8a passes the inflowing $NO_X$ therethrough when the exhaust gas air-fuel ratio of the inflowing exhaust gas is lean with respect to the stoichiometric air-fuel ratio (A/F)S (=about 14.6 and λ=1.0), and synthesizes $NH_3$ from $NO_X$ in the inflowing exhaust gas when the exhaust gas air-fuel ratio of the inflowing exhaust gas is rich, as shown in FIG. 2. The $NH_3$ synthesizing function of the three-way catalyst 8a is unclear, but it is considered that a part of $NO_X$ in the exhaust gas of which the exhaust gas air-fuel ratio is rich is converted to $NH_3$ according to the following reactions (1) and (2):

$$5H_2+2NO \rightarrow 2NH_3+2H_2O \tag{1}$$

$$7H_2+2NO_2 \rightarrow 2NH_3+4H_2O \tag{2}$$

On the contrary, it is considered that the other $NO_X$ is reduced to nitrogen $N_2$, according to the following reactions (3) to (6):

$$2CO+2NO \rightarrow N_2+2CO_2 \tag{3}$$

$$2H_2+2NO \rightarrow N_2+2H_2O \tag{4}$$

$$4CO+2NO_2 N_2+4CO_2 \tag{5}$$

$$4H_2+2NO_2 N_2+4H_2O \tag{6}$$

Accordingly, $NO_X$ flowing into the three-way catalyst 8a is converted to either $NH_3$ or $N_2$ when the exhaust gas air-fuel 7 ratio of the inflowing exhaust gas is rich, and thus $NO_X$ is prevented from being discharged from the three-way catalyst 8a.

As shown in FIG. 2, an efficiency ETA of the conversion of $NO_X$ flowing into the three-way catalyst 8a into $NH_3$ becomes higher as the exhaust gas air-fuel ratio of the inflowing exhaust gas becomes smaller with respect to the stoichiometric air-fuel ratio, and becomes constant when the exhaust gas air-fuel ratio becomes further smaller. In the example shown in FIG. 2, the conversion efficiency ETA reaches its constant value when the exhaust gas air-fuel ratio of the inflowing exhaust gas is smaller than about 13.8 (the air excess ratio λ is about 0.95).

Note that, in the engine shown in FIG. 1, it is desired to synthesize $NH_3$ in as large an amount as possible and to purify the unburned hydrocarbon HC as excellent as possible, because of the reasons described below, when the exhaust gas air-fuel ratio of the exhaust gas flowing in the three-way catalyst 8a is rich. Accordingly, a three-way catalyst which carries palladium Pd having the high efficiency of the conversion from $NO_X$ to $NH_3$, and cerium Ce having an oxygen storing function, is used as the three-way catalyst 8a. Further, note that a three-way catalyst carrying rhodium Rh suppresses the synthesis of $NH_3$ therein, and thus a three-way catalyst without rhodium Rh is desired to be used as the three-way catalyst 8a.

On the other hand, the occlusive material 11 is for temporarily storing $NO_X$ in the inflowing exhaust gas to prevent a large amount of $NO_X$ from flowing to the exhaust gas purifying catalyst 14. While the occlusive material 11 is not necessarily provided with a catalytic function, the occlusive material 11 in the present embodiment is comprised of an $NO_X$ occluding and reducing ($NO_X$—OR) catalyst 11a having the functions of the occluding and releasing $NO_X$, and the reducing $NO_X$. The $NO_X$—OR catalyst 11a comprises at least one substance selected from alkali metals such as potassium K, sodium Na, lithium Li, and cesium Cs, alkali earth metals such as barium Ba and calcium Ca, rare earth metals such as lanthanum La and yttrium Y, and transition metals such as iron Fe, and of precious metals such as platinum Pt, which are carried on a wash coat layer of, for example, alumina formed on the surface of the carrier. The $NO_X$—OR catalyst 11a performs the $NO_X$ occluding and releasing function in which the catalyst 11a occludes $NO_X$ therein when the exhaust gas air-fuel ratio of the inflowing exhaust gas is lean, and releases the occluded $NO_X$ therefrom when the oxygen concentration in the inflowing exhaust gas becomes lower.

If the $NO_X$—OR catalyst 11a is disposed in the exhaust passage of the engine, the $NO_X$—OR catalyst 11a actually performs the $NO_X$ occluding and releasing function, but the detailed mechanism of the function is still unclear. However, it is considered that the function is performed according to the following mechanism. This mechanism will be explained by using an example in which platinum Pt and barium Ba are carried on the carrier, but a similar mechanism is obtained when another precious metal, alkali metal, alkali earth metal, rare earth metal or transition metal is used.

Namely, when the exhaust gas air-fuel ratio of the inflowing exhaust gas becomes lean, i.e., when the oxygen concentration in the inflowing exhaust gas greatly increases, the oxygen $O_2$ is deposited on the surface of platinum Pt in the form Of $O_2^-$ or $O^{2-}$. On the other hand, NO in the inflowing exhaust gas reacts with $O_2^-$ or $O^{2-}$ on the surface of the platinum Pt, and becomes $NO_2$ ($2NO+O_2 \rightarrow 2NO_2$). Subsequently, a part of the produced $NO_2$ is oxidized on the platinum Pt and is adsorbed in the $NO_X$–OR catalyst 11a, and is diffused in the $NO_X$–OR catalyst 11a in the form of nitric acid ions $NO_3^-$, while bonding with barium oxide BaO. In this way, $NO_X$ is occluded in the $NO_X$–OR catalyst 11a.

Contrarily, when the oxygen concentration in the inflowing exhaust gas becomes lower and the produced amount of $NO_2$ is lowered, the reaction proceeds in an inverse direction ($NO_3^- \rightarrow NO_2$), and thus nitric acid ions $NO_3^-$ in the $NO_X$—OR catalyst 11a are released in the form of $NO_2$ from the $NO_X$—OR catalyst 11a. Namely, when the oxygen concentration in the inflowing exhaust gas is lowered, in other words, when the exhaust gas air-fuel ratio of the inflowing exhaust gas is changed from lean to rich, for example, $NO_X$ is released from the $NO_X$—OR catalyst 11a. At this time, if a reducing agent such as HC exists around the $NO_X$—OR catalyst 11a, the $NO_X$ is reduced and purified by the HC.

The exhaust gas purifying catalyst 14 used in each embodiment described hereinafter is comprised of at least one transition element included in the fourth period of the periodic table or the VIII group, such as copper Cu, chromium Cr, vanadium V, titanium Ti, iron Fe, nickel Ni, cobalt Co, platinum Pt, palladium Pd, rhodium Rh, and iridium Ir, carried on a wash coat layer of alumina formed on the carrier.

When the temperature of the exhaust gas purifying catalyst 14 is within a temperature range determined by the catalyst component (i.e., an optimum temperature range described later), the catalyst 14 converts the $NH_3$ component contained in the exhaust gas of the oxidizing atmosphere into $N_2$ almost completely, and thereby purifies the $NH_3$.

When the temperature of the exhaust gas purifying catalyst 14 is higher than this optimum temperature range, the catalyst 14 oxidizes $NH_3$ in the inflowing exhaust gas to $NO_X$, and the $NO_X$ flows out to the downstream side of the catalyst 14. Namely, in a catalyst temperature range higher than the optimum temperature range, the following $NH_3$ oxidizing reactions (7) and (8) are predominant in the catalyst 14, and thus the amount of $NO_X$ ($NO_2$, NO) in the exhaust gas which has passed through the catalyst 14 increases.

$$4NH_3 + 7O_2 \rightarrow 4NO_2 + 6H_2O \qquad (7)$$

$$4NH_3 + 5O_2 \rightarrow 4NO + 6H_2O \qquad (8)$$

When the temperature of the exhaust gas purifying catalyst 14 is lower than the optimum temperature range, the ammonia decomposing reactions in the catalyst 14 is lowered, and the amount of $NH_3$ passing through the catalyst 14 and flowing out to the downstream side of the catalyst 14 increases.

Figure 3:
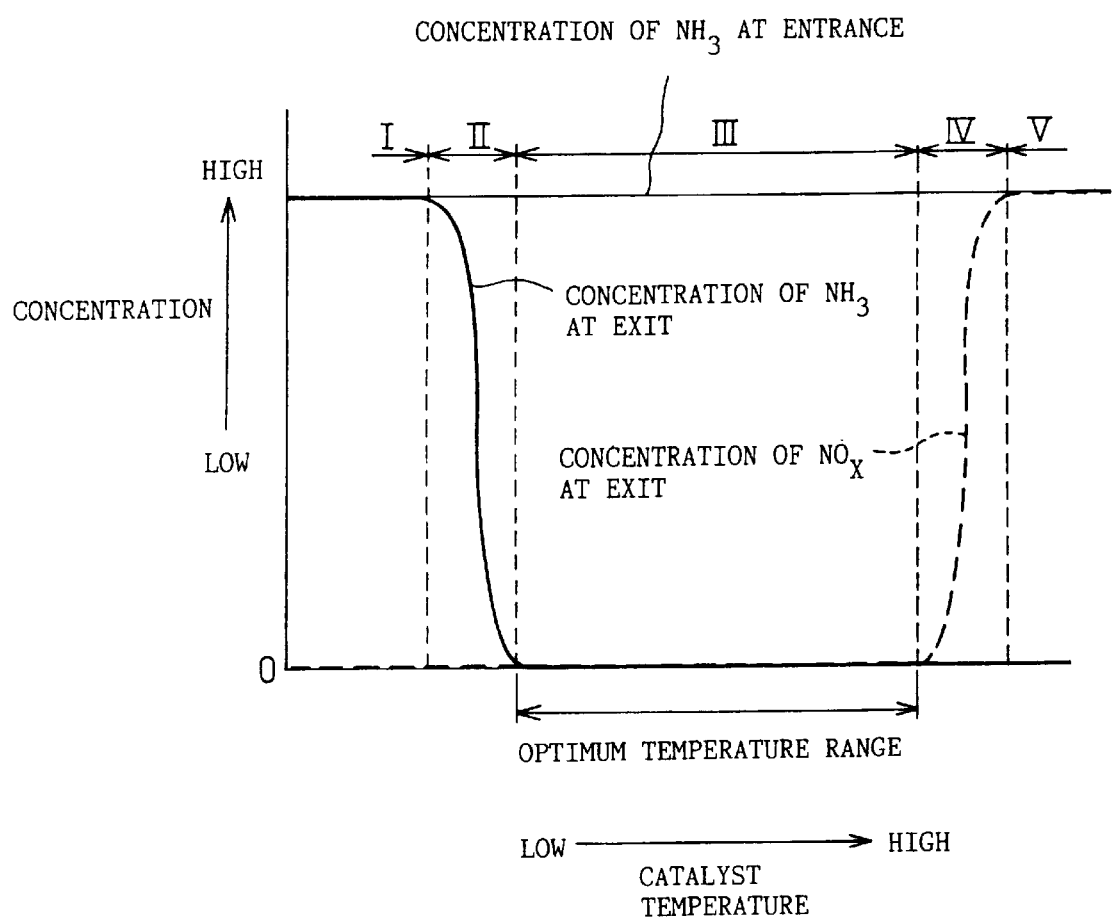
FIG. 3 is a diagram showing the characteristics of an exhaust gas purifying catalyst.

FIG. 3 is a schematic illustration showing a change in the exhaust gas purifying characteristics of the exhaust gas purifying catalyst 14 depending on the temperature change. FIG. 3 shows the relationships between the concentration of $NH_3$ and $NO_X$ in the exhaust gas at the exit of the catalyst 14 and the temperature of the catalyst 14, when a gas containing $NH_3$ of a predetermined concentration of the oxidizing atmosphere is supplied to the catalyst 14. The abscissa and the ordinate of FIG. 3 represent the temperature of the catalyst 14 and the concentration of each component, respectively. In FIG. 3, the solid line and the dotted line represent the $NH_3$ concentration at the catalyst exit and the $NO_X$ concentration at the catalyst exit, respectively.

As shown in FIG. 3, when the $NH_3$ concentration in the exhaust gas at the catalyst entrance is kept constant, in a region where the catalyst temperature is low (the region I in FIG. 3), the $NH_3$ concentration at the catalyst exit becomes almost equal to the $NH_3$ concentration at the catalyst entrance. On the contrary, the $NO_X$ concentration becomes almost zero. Namely, $NH_3$ in the inflowing gas passes through the catalyst 14 as it is and flows out to the downstream side.

In a region where the temperature thereof is higher than that of the temperature range I (the region II in FIG. 3), the $NH_3$ concentration at the exit is reduced in accordance with the increase of the temperature, and the $NO_X$ concentration at the exit is not changed and is kept almost zero. Namely, in this region, as the temperature of the exhaust gas purifying catalyst 14 rises, the ratio of $NH_3$ converted into $N_2$ to $NH_3$ flowing into the catalyst 14 increases.

When the temperature of the exhaust gas purifying catalyst 14 is raised further (the range III in FIG. 3), at the catalyst exit, the $NH_3$ concentration is further reduced while the $NO_X$ concentration is kept almost zero, and both of the $NH_3$ concentration and the $NO_X$ concentration become zero. Namely, in this temperature range, almost all of the $NH_3$ flowing to the catalyst 14 is converted into N2 and is purified without synthesizing $NO_X$.

When the temperature of the exhaust gas purifying catalyst 14 is raised higher than the temperature range III mentioned above (the temperature range IV in FIG. 3), the $NO_X$ concentration at the catalyst exit is increased as the temperature increases, and when the temperature of the catalyst 14 is further raised (the temperature range V in FIG. 3), the all of $NH_3$ flowing to the catalyst 14 is converted into $NO_X$.

In this specification, the temperature range III shown in FIG. 3, where almost all of $NH_3$ in the exhaust gas flowing to the exhaust gas purifying catalyst 14 is converted into $N_2$ while $NO_X$ is not synthesized, is referred to as the optimum temperature range of the catalyst 14.

This optimum temperature range is defined in accordance with substance used as the catalytic components, and starts from a temperature which is lower than, for example, the active temperature of the three-way catalyst. For example, when platinum Pt, palladium Pd, or rhodium Rh is carried on the carrier as a catalyst component, the optimum temperature range is approximately from 100 to 400° C. (preferably, from 100 to 250° C., and more preferably, from 100 to 250° C.). When chromium Cr, copper Cu, or iron Fe is carried on the carrier as a catalyst component, the optimum temperature range is approximately from 150 to 650° C. (preferably, from 150 to 500° C.).

When the exhaust gas purifying catalyst 14 is consisted as a tandem catalyst, which has a precious metal such as platinum Pt arranged in the downstream side with respect to the exhaust gas flow, and a base metal such as chromium Cr arranged in the upstream side, it is possible to extend the usable temperature range of the entire catalyst.

The reason why the exhaust gas purifying catalyst 14 almost completely converts $NH_3$ in the inflowing exhaust gas into $N_2$ in the above limited temperature range without synthesizing $NO_X$, and the reason why the catalyst 14 converts $NH_3$ in the inflowing exhaust gas into $NO_X$ in the temperature range exceeding the above temperature range, are still unclear. However, it is considered that these are because the following chemical reactions occur in the optimum temperature range of the catalyst 14.

Namely, when the catalyst temperature is within the optimum temperature range, the following denitrating reactions (9) and (10) occur in addition to the $NH_3$ oxidizing reactions (7) and (8) mentioned above:

$$8NH_3 + 6NO_2 \rightarrow 12H_2O + 7N_2 \qquad (9)$$

$$4NH_3 + 4NO + O_2 \rightarrow 6H_2O + 4N_2 \qquad (10)$$

Thus, it is considered that, due to the sequential reactions in which $NO_X$ synthesized by the oxidizing reactions (7) and (8) reacts with $NH_3$ in the exhaust gas, and is immediately converted to $N_2$ by the denitrating reactions (9) and (10), almost all of $NH_3$ in the exhaust gas is converted to $N_2$.

On the other hand, when the temperature of the exhaust gas purifying catalyst 14 is higher than the optimum temperature range, the oxidizing reactions (7) and (8) become active, and a ratio of $NH_3$ converted into $NO_X$ to that flowing to the catalyst 14 becomes high. Thus, the denitrating reactions (9) and (10) hardly occur. Therefore, at temperatures higher than the optimum temperature range, the synthesized $NO_X$ flows out from the catalyst 14 as it is, without being reduced by the denitrating reactions (9) and (10).

At temperatures lower than the optimum temperature range, the oxidizing reactions (7) and (8) become inactive. Thus, the amount of synthesized $NO_X$ is reduced, and the denitrating reactions (9) and (10) hardly occur. Therefore, at temperatures lower than the optimum temperature range, $NH_3$ flows out from the exhaust gas purifying catalyst 14, without being consumed by the denitrating reactions (9) and (10).

As described above, it is considered that the optimum temperature region of the exhaust gas purifying catalyst 14 is a temperature region where the $NH_3$ oxidizing reactions (7) and (8) and the denitrating reactions (9) and (10) balance each other, and the produced $NO_X$ immediately reacts with $NH_3$ and is reduced by the $NH_3$ by the sequential reactions. Therefore, the optimum temperature region is defined in accordance with the oxidizing ability of the catalyst and the change in the oxidizing ability with the temperature. Accordingly, it is considered that, as compared with a catalyst having a relatively low oxidizing ability which uses, for example, chromium Cr, the optimum temperature region of a catalyst having a high oxidizing ability which uses, for example, platinum Pt, as mentioned above, tends to be on a high temperature side.

While the mechanism has not been made clear yet as mentioned above, the following has been confirmed. Namely, when the exhaust gas purifying catalyst 14 is actually used in the above optimum temperature range, $NH_3$ in the inflowing oxidizing gas is almost completely converted into $N_2$.

Relating to this, the following three points have been confirmed when the exhaust purifying catalyst 14 is used in the above optimum temperature range.

The first point is that: when the exhaust gas flowing to the exhaust gas purifying catalyst 14 is an oxidizing atmosphere, i.e., when the exhaust gas air-fuel ratio of the exhaust gas flowing to the catalyst 14 is lean with respect to the stoichiometric air-fuel ratio, the inflowing $NH_3$ is completely converted into $N_2$, and this conversion is not affected by the degree of leanness of the exhaust gas air-fuel ratio of the inflowing exhaust gas.

The second point is that: when $NO_X$ is contained together with $NH_3$ in the exhaust gas flowing to the exhaust gas purifying catalyst 14, $NO_X$ is purified together with $NH_3$ in the catalyst 14, and the $NO_X$ concentration is almost zero at the exit of the catalyst. In this case, the ratio of the amount of $NH_3$ flowing to the catalyst 14 to that of $NO_X$, i.e., $NO_2$ or NO, is not necessarily an equivalent ratio (4:3 or 1:1) of the above-mentioned denitrating reactions (9) and (10). When the amount of $NH_3$ contained in the inflowing exhaust gas is larger than that necessary for reducing $NO_2$ and NO in the inflowing exhaust gas, $NO_X$ ($NO_2$ and NO) in the inflowing exhaust gas is completely purified. As described above, when the exhaust gas air-fuel ratio of the exhaust gas flowing to the catalyst 14 is lean, the surplus $NH_3$ is completely purified by the catalyst 14, and there is no possibility of the surplus $NH_3$ flowing out to the downstream of the catalyst.

However, when both of $NH_3$ and NO are contained in the exhaust gas flowing to the exhaust gas purifying catalyst 14, the range where the $NO_X$ concentration at the catalyst exit increases, as shown in FIG. 3 (the range IV shown in FIG. 3), starts at a lower temperature as compared with a case where the exhaust gas flowing to the catalyst 14 contains $NH_3$ and does not contain $NO_X$. Accordingly, the optimum temperature range becomes narrow in this case.

This is because, in a case where the exhaust gas flowing to the exhaust gas purifying catalyst 14 already contains $NO_X$, it is necessary to purify both of $NO_X$ synthesized by the oxidation of $NH_3$ in the high temperature region and of $NO_X$ in the inflowing exhaust gas, and $NH_3$ becomes easily insufficient. Conventionally, a catalyst of vanadium oxide/titania ($V_2O_5/TiO_2$) system is well known as a catalyst which causes a denitrating reaction between $NH_3$ and $NO_X$ in the inflowing exhaust gas. To react $NH_3$ with $NO_X$ in the catalyst 14 in a well balanced condition so that the surplus $NH_3$ or $NO_X$ does not flow out to the downstream side, it is necessary to accurately adjust the ratio of $NH_3$ to $NO_X$ to the equivalent ratio of the denitrating reaction. Namely, when both of $NO_2$ and NO are contained in the exhaust gas, it is necessary to accurately adjust the amount of $NH_3$ to be a summation of 4/3 times of the $NO_2$ amount and the NO amount in the exhaust gas. On the other hand, in the case of the catalyst 14 according to the present embodiment, if the amount of $NH_3$ with respect to the amount of $NO_X$ ($NO_2$ and NO) is equal to or larger than the aforementioned equivalent ratio, and if the exhaust gas air-fuel ratio of the inflowing exhaust gas is lean, both of $NO_X$ and $NH_3$ in the inflowing exhaust gas are completely purified so that $NO_X$ and $NH_3$ do not flow out to the downstream side. The catalyst 14 according to the present invention is greatly different from the conventional denitrating catalyst in this point.

The third point is that: even if HC and CO are contained in the exhaust gas flowing to the exhaust gas purifying catalyst 14, as long as the exhaust gas air-fuel ratio is lean, the HC and CO in the exhaust gas are oxidized by the catalyst 14, and do not flow out to the downstream side of the catalyst.

The exhaust gas purifying catalyst 14 completely decomposes $NH_3$ in the inflowing exhaust gas when the temperature is within the optimum temperature range, as mentioned above. However, as explained in FIG. 3, when the temperature is within the temperature region lower than the optimum temperature range, $NH_3$ in the inflowing exhaust gas is not be purified, and flows out to the downstream side of the catalyst.

It is known that acidic inorganic components (including BrØnsted acids such as zeolite, silica $SiO_2$, silica alumina $SiO_2 \cdot Al_2O_3$, and titania, and a Lewis acids such as the oxides of transition metal such as copper Cu, cobalt Co, nickel Ni, and iron Fe) adsorb $NH_3$ in a low temperature region. Accordingly, if the above acidic inorganic components are carried on the exhaust gas purifying catalyst 14, or alternatively if a porous material is comprised of the above acidic inorganic components and is used as the carrier, the surplus $NH_3$ in the inflowing exhaust gas is adsorbed in the carrier, at the temperature region lower than the optimum temperature range. Thus, it is possible to reduce the amount of unpurified $NH_3$ flowing out to the downstream side of the catalyst in the temperature region lower than the optimum temperature range. Further, the $NH_3$ adsorbed in the acidic inorganic components is desorbed when the temperature of the catalyst 14 is raised or when the $NH_3$ concentration in the inflowing exhaust gas is lowered. Because the $NH_3$ desorbed from the exhaust gas purifying catalyst 14 is decomposed by the catalyst 14, the $NH_3$ purifying efficiency is enhanced by using the acid carrier as mentioned above as a whole, when the temperature of the catalyst 14 fluctuates.

In the engine shown in FIG. 1, the fuel injection time TAU is calculated by the following equation:

$$TAU = TB \cdot ((A/F)S/(A/F)T) \cdot FAF$$

If the air-fuel ratio of the air-fuel mixture in the combustion chamber in each cylinder is referred to as an engine air-fuel ratio, TB represents a basic fuel injection time suitable for making the engine air-fuel ratio of each cylinder equal to the stoichiometric airfuel ratio (A/F)S, and is calculated by the following equation:

$$TB = (Q/N) \cdot K$$

where Q, N, and K represent the intake air amount, the engine speed, and a constant, respectively. Thus, the basic fuel injection time TB is obtained by multiplying the intake air amount per one revolution of the engine with the constant. (A/F)T represents a target value for the control of the engine air-fuel ratio. When the target value (A/F)T is increased to make the engine air-fuel ratio leaner than the stoichiometric air-fuel ratio (A/F)S, the fuel injection time TAU is shortened, and thus the fuel amount to be injected is reduced. When the target value (A/F)T is decreased to make the engine air-fuel ratio richer than the stoichiometric air-fuel ratio (A/F)S, the fuel injection time TAU is extended, and thus the fuel amount to be injected is increased. In the present embodiment, the target values (A/F)T of the engine air-fuel ratio of the cylinders of the second cylinder group 1b are the same.

FAF represents a feedback correction coefficient to make the actual engine air-fuel ratio equal to the target value (A/F)T. This feedback correction coefficient is made FAFA when the fuel injection time TAU for the cylinder of the first cylinder group 1a, i.e., the first cylinder #1, is calculated, and is made FAFB when the fuel injection time TAU for each cylinder of the second cylinder group 1b, i.e., the second cylinder #2, the third cylinder #3, or the fourth cylinder #4, is calculated. The feedback correction coefficient FAFA is determined in accordance with an output signal of the air-fuel ratio sensor 29, and the feedback correction coefficient FAFB is determined in accordance with an output signal of the air-fuel ratio sensor 31. In the engine shown in FIG. 1, the air-fuel ratio sensors 29 and 31 are respectively composed of so called overall region air-fuel ratio sensors which generate continuous signals corresponding to the exhaust gas air-fuel ratio over the wide exhaust gas air-fuel ratio range. The exhaust gas air-fuel ratio of the exhaust gas in the exhaust pipe 7 detected by the air-fuel ratio sensor 29 is equal to the engine air-fuel ratio of the first cylinder group 1a. When the engine air-fuel ratio detected by the air-fuel ratio sensor 29 is leaner than the target value (A/F)T, the feedback correction coefficient FAFA is increased to thereby increase the fuel amount to be injected. When the engine air-fuel ratio detected by the sensor 29 is richer than the target value (A/F)T, the feedback correction coefficient FAFA is reduced to thereby reduce the fuel amount to be injected. In this way, the engine air-fuel ratio of the first cylinder group 1a is made equal to the target value (A/F)T.

The exhaust gas air-fuel ratio of the exhaust gas in the exhaust manifold 10 is equal to the engine air-fuel ratio of the second cylinder group 1b. When the engine air-fuel ratio detected by the air-fuel ratio sensor 31 is leaner than the target value (A/F)T, the feedback correction coefficient FAFB is increased to thereby increase the fuel amount to be injected. When the engine air-fuel ratio detected by the sensor 31 is richer than the target value (A/F)T, the feedback correction coefficient FAFB is reduced to thereby reduce the fuel amount to be injected. In this way, the engine air-fuel ratio of each cylinder of the second cylinder group 1b is made equal to the target value (A/F)T. The feedback correction coefficients FAFA, FAFB fluctuate around 1.0, respectively.

To make the engine air-fuel ratio more accurately equal to the target value (A/F)T, an additional air-fuel sensor may be arranged in the interconnecting pipe 13 where the additional sensor does not contact with the exhaust gas discharged from the second cylinder group 1b, i.e., for example, in the interconnecting pipe 13 just downstream of the three-way catalyst 8a, and the deviation of the engine air-fuel ratio of the first cylinder group 1a from the target value (A/F)T may be compensated in accordance with an output signal of the additional sensor, which deviation is caused by the deterioration of the air-fuel ratio sensor 29. Alternatively, another additional air-fuel sensor may be arranged in the interconnecting pipe 13 where the sensor does not contact with the exhaust gas discharged from the first cylinder group 1a, i.e., for example, in the interconnecting pipe 13 just downstream of the $NO_X$—OR catalyst 11a, and the deviation of the engine air-fuel ratio from the target value (A/F)T may be compensated in accordance with an output signal of the sensor, which deviation is caused by the deterioration of the air-fuel ratio sensor 31. For the additional air-fuel ratio sensors, a so called Z-characteristic type oxygen sensor, of which the output voltage changes stepwise when the exhaust gas air-fuel ratio increases or decreases exceeding the stoichiometric air-fuel ratio, may be used, in addition to the overall range air-fuel ratio sensors. In this case, the air-fuel ratio sensors are arranged in the exhaust passage in series. The deterioration of the catalyst arranged between the additional air-fuel ratio sensors may be detected in accordance with the output signals of the plurality of the air-fuel ratio sensors.

In the engine shown in FIG. 1, no device is provided for secondarily feeding fuel or air into the exhaust gas passage. Accordingly the exhaust gas air-fuel ratio of the exhaust gas flowing to the three-way catalyst 8a is equal to the engine air-fuel ratio of the first cylinder group 1a, i.e., the engine air-fuel ratio of the first cylinder #1, and the exhaust gas air-fuel ratio of the exhaust gas flowing to the $NO_X$—OR catalyst 11a is equal to the engine air-fuel ratio of the second cylinder group 1b, i.e., the engine air-fuel ratios of the second cylinder #2, the third cylinder #3, and the fourth cylinder #4.

Next, referring to FIG. 4, the basic exhaust gas purifying method of the engine shown in FIG. 1 will be explained.

In the engine shown in FIG. 1, the exhaust gas air-fuel ratio of the exhaust gas flowing to the three-way catalyst 8a is made rich, and the exhaust gas air-fuel ratio of the exhaust gas flowing to the $NO_X$—OR catalyst 11a is made lean. When the exhaust gas air-fuel ratio of the exhaust gas flowing to the three-way catalyst 8a is made rich, $NH_3$ is synthesized from $NO_X$ in the inflowing exhaust gas in the three-way catalyst 8a. The $NH_3$ then flows to the exhaust gas purifying catalyst 14 via the interconnecting pipe 13. On the other hand, when the exhaust gas air-fuel ratio of the exhaust gas flowing to the $NO_X$—OR catalyst 11a is made lean, $NO_X$ in the inflowing exhaust gas is occluded in the $NO_X$—OR catalyst 11a. In this case, all $NO_X$ flowing to the $NO_X$—OR catalyst 11a is not necessarily occluded in the $NO_X$—OR catalyst 11a, but a portion of $NO_X$ flowing to the $NO_X$—OR catalyst 11a is not occluded in the $NO_X$—OR catalyst 11a, and passes through the $NO_X$—OR catalyst 11a without being occluded in the $NO_X$—OR catalyst 11a. The $NO_X$ then flows to the catalyst 14 via the interconnecting pipe 13.

Both of the exhaust gas from the three-way catalyst 8a and that from the $NO_X$—OR catalyst 11a flow to the exhaust gas purifying catalyst 14. In the present embodiment, the exhaust gas air-fuel ratio of the exhaust gas flowing to the catalyst 14 is always kept lean. Therefore, $NO_X$ and $NH_3$ in the exhaust gas flowing to the catalyst 14 is purified by the reactions represented by the reactions (7) to (10) mentioned before, in the catalyst 14. Accordingly, $NO_X$ and $NH_3$ are prevented from being discharged into the ambient air. Note that the exhaust gas flowing to the catalyst 14 contains hydrocarbon HC, carbon monoxide CO, or hydrogen $H_2$. It is considered that the HC, CO, etc. act as the reducing agent, and reduce a part of $NO_X$ in the catalyst 14. However, the reducing ability of $NH_3$ is larger than that of HC, CO, etc. Thus, $NO_X$ is surely reduced by using $NH_3$ as a reducing agent.

To make the exhaust gas air-fuel ratio of the exhaust gas flowing to the three-way catalyst 8a rich, the cylinder of the first cylinder group 1a performs a rich operation, in which the engine air-fuel ratio is made rich with respect to the stoichiometric air-fuel ratio (A/F)S. Namely, if the target value of the engine air-fuel ratio of each cylinder is referred to as a target air-fuel ratio (A/F)T, the exhaust gas air-fuel ratio of the exhaust gas flowing to the three-way catalyst 8a is made rich by making the target air-fuel ratio (A/F)T of the first cylinder #1 equal to a rich air-fuel ratio (A/F)R that is rich with respect to the stoichiometric air-fuel ratio (A/F)S.

To make the exhaust gas air-fuel ratio of the exhaust gas flowing to the $NO_X$—OR catalyst 11a lean, each cylinder of the second cylinder group 1b performs a lean operation, in which the engine air-fuel ratio is lean with respect to the stoichiometric air-fuel ratio (A/F)S. Namely, the exhaust gas air-fuel ratio of the exhaust gas flowing to the $NO_X$—OR catalyst 11a is made lean by making each target air-fuel ratio (A/F)T of the second cylinder #2, the third cylinder #3, and the fourth cylinder #4 equal to a lean air-fuel ratio (A/F)L that is lean with respect to the stoichiometric air-fuel ratio (A/F)S.

Note that, to make the exhaust gas air-fuel ratio of the exhaust gas flowing to the three-way catalyst 8a rich, there may be provided a secondary fuel feeding device for secondarily feeding fuel into the exhaust pipe 7 upstream of the three-way catalyst 8a, for example. In this case, the exhaust gas air-fuel ratio of the exhaust gas flowing to the three-way catalyst 8a is made rich by secondarily feeding fuel by the secondary fuel feeding device while the first cylinder group 1a performs the lean operation.

The rich air-fuel ratio (A/F)R and the lean air-fuel ratio (A/F)L may be changed in accordance with the engine operating condition. However, in the present embodiment, the rich air-fuel ratio (A/F)R and the lean air-fuel ratio (A/F)L are made substantially constant irrespective of the engine operating condition. Namely, the rich air-fuel ratio (A/F)R is set to about 14.0, and the lean air-fuel ratio (A/F)L is set to about 25.0. Accordingly, the target air-fuel ratio (A/F)T of the first cylinder #1 is kept at about 14.0, and that of each of the second cylinder #2, the third cylinder #3, and the fourth cylinder #4 is kept at about 25.0.

The lean operation reduces the rate of fuel consumption. Thus, in the engine shown in FIG. 1 in which the second cylinder group 1b basically performs the lean operation, the rate of fuel consumption is reduced while the exhaust gas is purified sufficiently. Especially, in the engine shown in FIG. 1, the number of cylinders of the second cylinder group 1b is larger than a half of the all cylinders of the engine. Thus, the rate of fuel consumption of the engine 1 is reduced greatly.

In this way, when the first cylinder group 1a performs the rich operation and the second cylinder group 1b performs the lean operation, $NO_X$ and $NH_3$ are prevented from being discharged into the ambient air. Thus, if the first cylinder group 1a always performs the rich operation and the second cylinder group 1b always performs the lean operation, $NO_X$ and $NH_3$ are always prevented from being discharged into the ambient air. However, the inventors of the present invention have found that the catalytic activity of the three-way catalyst 8a is deteriorated, if the three-way catalyst 8a contacts with an exhaust gas of which air-fuel ratio is rich for a long time, and that, especially, the catalytic activity is remarkably deteriorated when a three-way catalyst includes palladium Pd. Thus, if the first cylinder group 1a always performs the rich operation and thereby the exhaust gas air-fuel ratio of the exhaust gas flowing to the three-way catalyst 8a is always made rich, the catalytic activity of the three-way catalyst 8a is gradually deteriorated. As a result, $NO_X$ and $NH_3$ are discharged into the ambient air.

On the other hand, the inventors of the present invention have also found that, if the three-way catalyst, of which the catalytic activity is deteriorated by contacting with the exhaust gas of which the exhaust gas air-fuel ratio is rich for a long time, contacts with the exhaust gas of which the exhaust gas air-fuel ratio is lean, the catalytic activity of the three-way catalyst is recovered. Thus, in the present embodiment, the exhaust gas air-fuel ratio of the exhaust gas flowing to the three-way catalyst 8a is temporarily made lean to recover the catalytic activity of the three-way catalyst 8a. As a result, the good catalytic activity of the three-way catalyst 8a is ensured, and thus $NO_X$ and $NH_3$ are always excellently purified.

To make the exhaust gas air-fuel ratio of the exhaust gas flowing to the three-way catalyst 8a lean, there may be provided a secondary air feeding device for feeding secondary air to the three-way catalyst 8a, and the secondary air may be temporarily fed by the secondary air feeding device while the first cylinder group 1a performs the rich operation. On the other hand, the engine air-fuel ratio of the first cylinder group 1a is equal to the exhaust gas air-fuel ratio of the exhaust gas flowing to the three-way catalyst 8a, as mentioned above. Thus, in the present embodiment, the first cylinder group 1a performs the lean operation temporarily, to make the exhaust gas air-fuel ratio of the exhaust gas flowing to the three-way catalyst 8a temporarily lean. Namely, in the present embodiment, the first cylinder group 1a performs the rich operation basically, and when the catalytic activity of the three-way catalyst 8a is deteriorated, the first cylinder group 1a performs the lean operation temporarily.

In more detail, it is determined whether the catalytic activity of the three-way catalyst 8a becomes lowered than a predetermined tolerable value, and, when it is determined that the catalytic activity of the three-way catalyst 8a becomes lowered than the tolerable value, the target air-fuel ratio (A/F)T of the first cylinder #1 is made the lean air-fuel ratio (A/F)LL, which is leaner than the stoichiometric air-fuel ratio (A/F)S for, for example, a predetermined time "t" so that the first cylinder #1 performs the lean operation. When the first cylinder #1 performs the lean operation and thereby the exhaust gas air-fuel ratio of the exhaust gas flowing to the three-way catalyst 8a is made lean, the catalytic activity of the three-way catalyst 8a is recovered. Note that, in the present embodiment, the lean air-fuel ratio (A/F)LL is constant irrespective of the engine operating conditions, and is set to 25.0, for example. Alternatively, the lean air-fuel ratio (A/F)LL may be appropriately changed, for example, in accordance with the catalytic activity of the three-way catalyst 8a or the engine operating conditions.

It is difficult to directly find the catalytic activity of the three-way catalyst 8a. Thus, in the present embodiment, the catalytic activity of the three-way catalyst 8a is estimated on the basis of the amount of HC flowing to the three-way catalyst 8a. Namely, it is considered that, when the amount of HC flowing to the three-way catalyst 8a becomes larger, the surface of a catalyst component such as palladium Pd or platinum Pt is covered by the HC to deteriorate the catalytic activity of the three-way catalyst 8a, although a mechanism by which the catalytic activity of the three-way catalyst 8a is deteriorated when the exhaust gas of which the exhaust gas air-fuel ratio is rich is introduced to the three-way catalyst 8a is still unclear. Thus, if an amount of HC required to lower the catalytic activity of the three-way catalyst 8a beyond the tolerable value is obtained in advance, the catalytic activity of the three-way catalyst 8a can be estimated by finding the amount of HC flowing to the three-way catalyst 8a. Note that the catalytic activity of the three-way catalyst 8a may be estimated on the basis of the engine operating conditions, the engine operating time, or an amount of the exhaust gas passing through the three-way catalyst 8a.

Figure 5A:
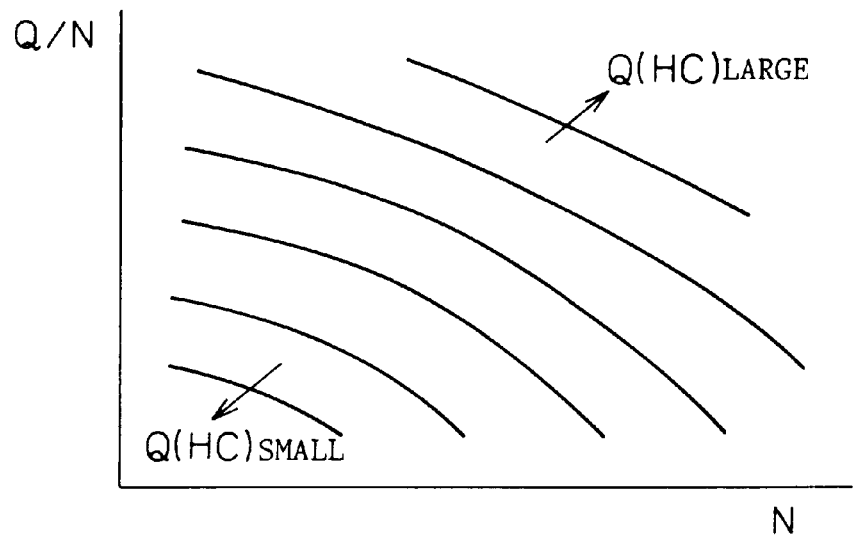
FIGS. 5A and 5B are diagrams showing an amount of HC discharged from the first cylinder group per unit time.
Figure 5B:
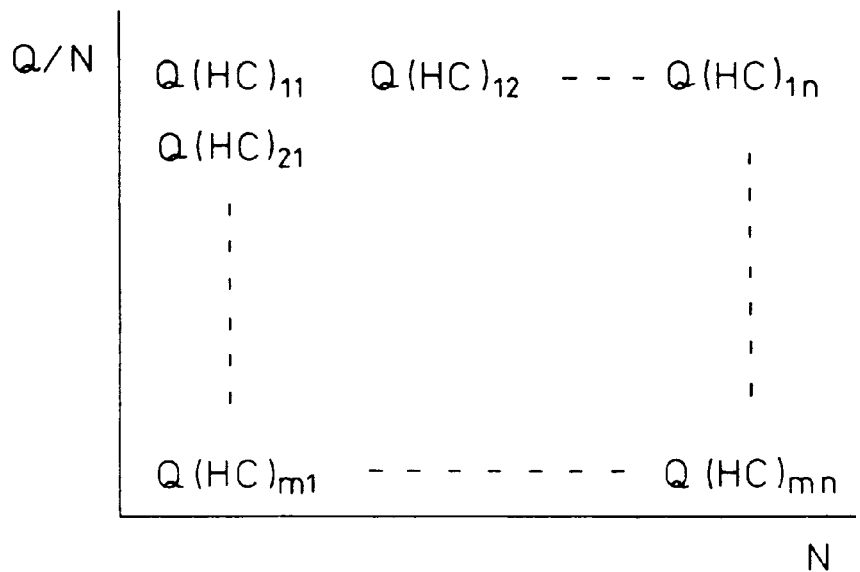

FIG. 5A shows relationships, obtained by experiments, between the amount Q(HC) of HC discharged from the first cylinder group 1a per unit time, and the engine load Q/N and the engine speed N, with a constant rich air-fuel ratio (A/F)R. In FIG. 5A, each curve represents an identical amount of HC. As the engine speed N increases, the amount of the exhaust gas discharged from the engine per unit time increases. Also, as the engine load Q/N increases, the amount of the exhaust gas discharged from the engine increases. Thus, as shown in FIG. 5A, the amount Q(HC) of HC discharged from the first cylinder group 1a per unit time, i.e., the amount of HC flowing to the three-way catalyst 8a per unit time increases, as the engine load Q/N increases, and as the engine speed N increases. The HC amount Q(HC) shown in FIG. 5A is previously stored in the ROM 22 in the form of a map as shown in FIG. 5B.

Therefore, the amount S(HC) of HC flowing to the three-way catalyst 8a when the first cylinder 1 performs the rich operation is found by the following equation:

S(HC)=S(HC)+Q(HC)·DELTAa where DELTAa represents a time interval of detection of Q(HC), and thus Q(HC)· DELTAa represents the amount of HC flowing to the three-way catalyst 8a from the previous processing routine to the present processing routine.

The timechart in FIG. 6 shows a change in the engine air-fuel ratio of the first cylinder group 1a. In FIG. 6, time zero represents a time at which the rich operation starts in the first cylinder group 1a, i.e., the first cylinder #1. In this case, the target air-fuel ratio (A/F)T of the first cylinder #1 is kept the rich air-fuel ratio (A/F)R as shown in FIG. 6. When the rich operation of the first cylinder #1 starts, the HC amount S(HC) gradually increases, and exceeds the tolerable maximum value TM at the time "a". The tolerable maximum value TM is an amount of HC required for deteriorating the catalytic activity beyond the above-mentioned tolerable value, and is previously found by experiments. Namely, when S(HC)>TM, it is determined that the catalytic activity of the three-way catalyst 8a is deteriorated, and at this time, the target air-fuel ratio (A/F)T of the first cylinder #1 is made the lean air-fuel ratio (A/F)LL. The target air-fuel ratio (A/F)T is kept the lean air-fuel ratio (A/F)LL for a selected time "t". The selected time "t" is a lean operation time required for recovering the catalytic activity of the three-way catalyst 8a, and is previously found by experiments. When the selected time t has passed after the target air-fuel ratio (A/F)T is made the air-fuel ratio (A/F)LL, the target air-fuel ratio (A/F)T of the first cylinder #1 is made the rich air-fuel ratio (A/F)R again. Note that S(HC) is reset at the time "a", and the calculation of S(HC) is resumed when the rich operation of the first cylinder #1 is resumed at the time "a+t".

When the first cylinder group 1a performs the lean operation in this way, $NO_X$ discharged from the first cylinder group 1a at this time reaches the exhaust gas purifying catalyst 14 without being converted into $NH_3$ or $N_2$ by the three-way catalyst 8a. However, when the second cylinder group 1b perform the lean operation at this time, both $NO_X$ discharged from the first cylinder group 1a and $NO_X$ discharged from the second cylinder group 1b flow to the catalyst 14. As a result, $NO_X$ is released into the ambient air without being purified in the catalyst 14. On the other hand, when the second cylinder group 1b performs the rich operation, a part of HC discharged from the second cylinder group 1b passes through the $NO_X$—OR catalyst 11a without being oxidized in the $NO_X$—OR catalyst 11a. Therefore, in the present embodiment, when the first cylinder group 1a must perform the lean operation, the second cylinder group 1b performs the rich operation to feed HC to the catalyst 14, to thereby purify $NO_X$ discharged from the first cylinder group 1a by the HC. As a result, even when the first cylinder group 1a performs the rich operation or the lean operation, it is possible to purify $NO_X$ excellently.

Namely, as shown in FIG. 6, when the first cylinder group 1a must perform the lean operation temporarily, the target air-fuel ratio (A/F)T of each cylinder of the second cylinder group 1b is temporarily made a rich air-fuel ratio (A/F)RR, which is richer than the stoichiometric air-fuel ratio (A/F)S, so that the second cylinder group 1b performs the rich operation temporarily. In the present embodiment, the rich air-fuel ratio (A/F)RR is set constant irrespective of the engine operating conditions, and is kept 14.0, for example.

When the exhaust gas air-fuel ratio of the exhaust gas flowing to the $NO_X$—OR catalyst 11a is made rich, $NO_X$ occluded in the $NO_X$—OR catalyst 11a is released therefrom. Thus, when the second cylinder group 1b performs the rich operation in this way, at least a part of $NO_X$ occluded in the $NO_X$—OR catalyst 11a is released therefrom, and thus the $NO_X$ occluding capacity of the $NO_X$—OR catalyst 11a is recovered. Therefore, even if the amount of $NO_X$ flowing to the $NO_X$—OR catalyst 11a increases widely, it is possible to prevent a large amount of $NO_X$ from flowing to the catalyst 14, to thereby purify $NO_X$ excellently in the catalyst 14. Note that, when the exhaust gas air-fuel ratio of the exhaust gas flowing to the $NO_X$—OR catalyst 11a is made rich, the $NO_X$ released from the $NO_X$—OR catalyst 11a is reduced by HC and CO, etc., in the inflowing exhaust gas.

In a case where the target air-fuel ratio (A/F)T is very lean such as 25.0, if an air-fuel mixture which fills the combustion chamber substantially uniformly is formed, the air-fuel mixture is not be ignited, even when the spark plug (not shown) sparks, because the air-fuel mixture is very lean. As a result, a misfire will occur. Thus, in the engine shown in FIG. 1, when the engine must perform the lean operation, an ignitable air-fuel mixture is formed in a restricted region of the combustion chamber and the other region of the combustion chamber is filled with only air or only air and the EGR gas, and then the air-fuel mixture is ignited by the spark plug. As a result, even when the engine air-fuel ratio is very lean, a misfire is prevented. Alternatively, the uniform air-fuel mixture and a swirl flow may be formed in the combustion chamber, to thereby prevent a misfire.

Next, referring to FIGS. 7 and 8, the routine to execute the above-mentioned embodiment will be explained.

Figure 7:
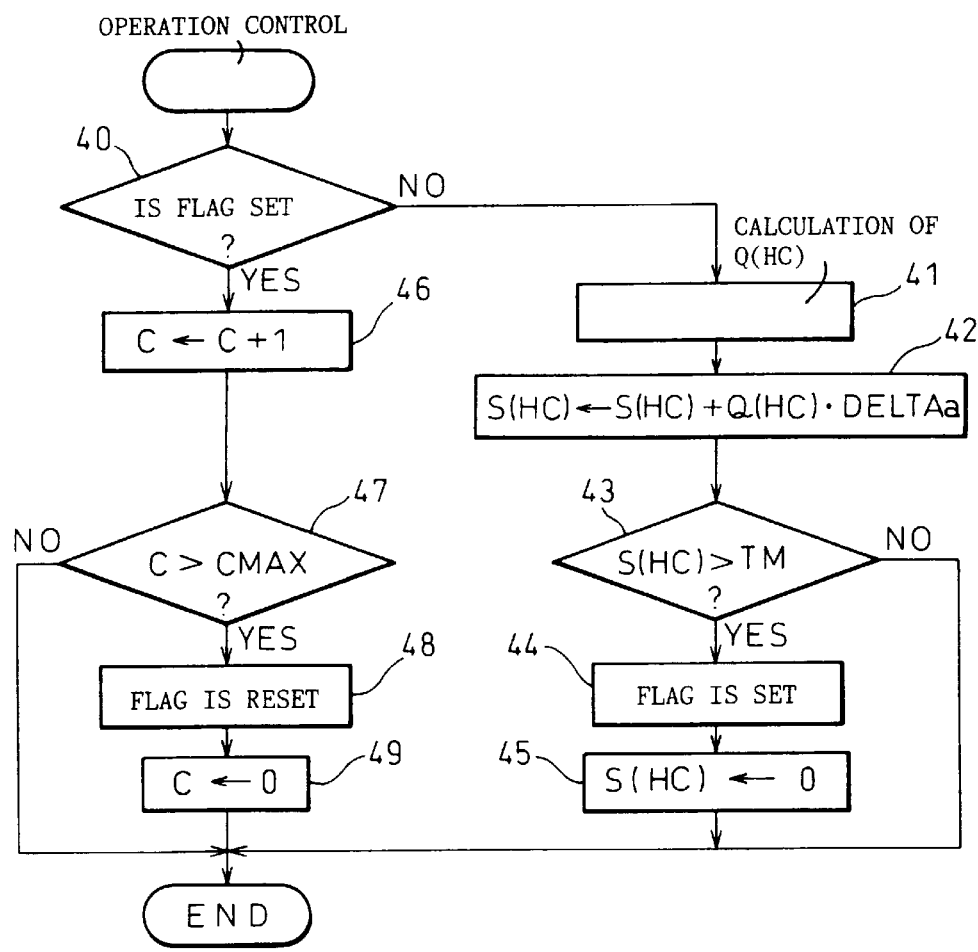
FIG. 7 is a flowchart for executing the operation control.

FIG. 7 shows an operation control routine. This routine is executed by interruption every predetermined time.

Referring to FIG. 7, first, in step 40, it is judged whether a flag which is set when the first cylinder group 1a must perform the lean operation, is set. When the flag is reset, the routine goes to step 41, where Q(HC) is calculated from the map shown in FIG. 5B in accordance with the engine load Q/N and the engine speed N. In the following step 42, the HC amount S(HC) is calculated by the following equation:

$$S(HC) = S(HC) + Q(HC) \cdot DELTAa$$

Then, the routine goes to step 43, where it is judged whether the HC amount S(HC) is larger than the tolerable maximum value TM. When S(HC)>TM, the routine goes to step 44, where the flag is set. Namely, when S(HC)>TM, it is judged that the catalytic activity of the three-way catalyst 8a is deteriorated, and the first cylinder group 1a is made to perform the lean operation. In the following step 45, the HC amount S(HC) is reset. Then, the processing cycle is ended. On the other hand, when S(HC)≦TM in step 43, the processing cycle is ended. Namely, when S(HC)≦TM, it is judged that the catalytic activity of the three-way catalyst 8a is not deteriorated, and the rich operation of the first cylinder group 1a is continued.

When the flag is set, the routine goes from step 40 to step 46, where the timer count value C is incremented by 1. The timer count value C represents the time during which the first cylinder group 1a performs the lean operation. In the following step 47, it is judged whether the timer count value C is larger than a predetermined value CMAX. CMAX corresponds to the selected time "t" mentioned above. When C≦CMAX, it is judged that the catalytic activity of the three-way catalyst 8a is not sufficiently recovered and the processing cycle is ended. Namely, the lean operation of the first cylinder group 1a is continued. On the other hand, when C>CMAX, it is judged that the selected time "t" has passed from when the lean operation of the first cylinder 1a was started. Namely, it is judged that the catalytic activity of the three-way catalyst 8a has been recovered, and the routine goes to step 48, where the flag is reset. Accordingly, the lean operation of the first cylinder group 1a is stopped and the rich operation is resumed. Then, the routine goes to step 49, where the timer count value C is cleared. Then, the processing cycle is ended.

FIG. 8 shows a calculation routine for the fuel injection time TAU. This routine is executed by interruption every predetermined crank angle.

Referring to FIG. 8, first, in step 60, the basic fuel injection time TB is calculated in accordance with the following equation on the basis of the intake air amount Q and the engine speed N.

$$TB = (Q/N) \cdot K$$

In the following step 61, it is judged whether the fuel injection time TAU to be found in the present processing cycle is the fuel injection time for the first cylinder group 1a or for the second cylinder group 1b. When the fuel injection time TAU to be found in the present processing cycle is judged to be the fuel injection time for the first cylinder group 1a, i.e., the first cylinder #1, the routine goes to step 62, where the feedback correction coefficient FAFA for the first cylinder group 1a is calculated. In the following step 63, FAFA is memorized as FAF. In the following step 64, it is judged whether the flag which is set or reset in the routine shown in FIG. 7 is set. When the flag is set, i.e., when the first cylinder group 1a must perform the lean operation, the routine goes to step 65, where the target air-fuel ratio (A/F)T is set to the lean air-fuel ratio (A/F)LL. In the present embodiment, the lean air-fuel ratio (A/F)LL is maintained at a constant value of 25.0 irrespective of the engine operating condition. Thus, in step 65, (A/F)T is set to 25.0. Then, the routine goes to step 72. On the other hand, when the flag is reset in step 64, i.e., when the first cylinder group 1a must perform the rich operation, the routine goes to step 66, where the target air-fuel ratio (A/F)T is set to the rich air-fuel ratio (A/F)R. In the present embodiment, the rich air-fuel ratio (A/F)R is maintained at a constant value of 14.0 irrespective of the engine operating condition. Thus, in step 66, (A/F)T is set to 14.0. Next, the routine goes to step 72.

In step 61, when it is judged that the fuel injection time TAU to be found in the present processing cycle is for the second cylinder group 1b, i.e., for any one of the second cylinder #2, the third cylinder #3, and the fourth cylinder #4, the routine goes to step 67, where the feedback correction coefficient FAFB for the second cylinder group 1b is calculated. In the following step 68, FAFB is memorized as FAF. In the following step 69, it is judged whether the flag is set. When the flag is set, i.e., when the second cylinder group 1b must perform the rich operation, the routine goes to step 70, where the target air-fuel ratio (A/F)T is set to the rich air-fuel ratio (A/F)RR. In the present embodiment, the rich air-fuel ratio (A/F)RR is maintained at a constant value of 14.0 irrespective of the engine operating condition. Thus, in step 70, (A/F)T is set to 14.0. Then, the routine goes to step 72. Contrarily, when the flag is reset, i.e., when the second cylinder group 1b must perform the lean operation, the routine goes to step 71, where the target air-fuel ratio (A/F)T is set to the lean air-fuel ratio (A/F)L. In the present embodiment, the lean air-fuel ratio (A/F)L is maintained at a constant value of 25.0 irrespective of the engine operating condition. Thus, in step 71, (A/F)T is set to 25.0. Then, the routine goes to step 72.

In step 72, the fuel injection time TAU is calculated according to the following equation.

$$TAU = TB \cdot ((A/F)S/(A/F)T) \cdot FAF$$

Fuel is injected from each fuel injector 5 for the period of the fuel injection time TAU.

Next, another embodiment of the operation controlling method will be explained.

In the aforementioned embodiment, when the cumulative amount S(HC) of HC flowing to the three-way catalyst 8a exceeds the tolerable maximum value TM, the exhaust gas air-fuel ratio of the exhaust gas flowing to the three-way catalyst 8a is temporarily made lean to recover the catalytic activity of the three-way catalyst 8a, considering the following fact. Namely, the catalytic activity of the three-way catalyst 8a is deteriorated when the exhaust gas air-fuel ratio of the exhaust gas flowing to the three-way catalyst 8a is rich and the cumulative HC amount S(HC) is increased. In other words, as long as the cumulative HC amount S(HC) does not exceed the tolerable maximum value TM, i.e., as long as the catalytic activity of the three-way catalyst 8a is not deteriorated to the tolerable value, the catalytic activity recovering operation of the three-way catalyst 8a is not performed. However, it is possible to perform the catalytic activity recovery operation of the three-way catalyst 8a at relatively short intervals before the catalytic activity of the three-way catalyst 8a is deteriorated to the tolerable value. Such a catalytic activity recovery operation of the three-way catalyst 8a at short intervals keeps the catalytic activity of the three-way catalyst 8a at a high level.

On the other hand, it is desirable for the size of the exhaust gas purifying device to be as small as possible. Thus, it is not preferable that the volume of the $NO_X$—OR catalyst 11a is increased. However, if the volume of the $NO_X$—OR catalyst 11a is decreased, the $NO_X$ occluding capacity of the $NO_X$—OR catalyst 11a is reduced. Thus, the $NO_X$—OR catalyst 11a becomes easily saturated with $NO_X$. Therefore, to release $NO_X$ occluded in the $NO_X$—OR catalyst 11a, it is necessary to make the exhaust gas air-fuel ratio of the exhaust gas flowing to the $NO_X$—OR catalyst 11a temporarily rich at relatively short intervals. In this case, an amount of $NO_X$ occluded in the $NO_X$—OR catalyst 11a is found and when the found $NO_X$ amount exceeds a predetermined maximum value, the exhaust gas air-fuel ratio of the exhaust gas flowing to the $NO_X$—OR catalyst 11a is made temporarily rich. As a result, $NO_X$ occluded in the $NO_X$—OR catalyst 11a is released, and the $NO_X$ occluding capacity of the $NO_X$—OR catalyst 11a is ensured.

As mentioned above, it is preferable for the exhaust gas purification that the exhaust gas air-fuel ratio of the exhaust gas flowing to the three-way catalyst 8a is made lean when the exhaust gas air-fuel ratio of the exhaust gas flowing to the $NO_X$—OR catalyst 11a is made rich. Thus, if the exhaust gas air-fuel ratio of the exhaust gas flowing to the $NO_X$—OR catalyst 11a is made temporarily rich in accordance with the amount of $NO_X$ occluded in the $NO_X$—OR catalyst 11a and the exhaust gas air-fuel ratio of the exhaust gas flowing to the three-way catalyst 8a is made lean in accordance with the exhaust gas air-fuel ratio of the exhaust gas flowing to the $NO_X$—OR catalyst 11a, the three points as follows are obtained. Namely, the $NO_X$ occluding capacity of the $NO_X$—OR catalyst 11a is ensured, the exhaust gas is excellently purified, and the catalytic activity recovering operation of the three-way catalyst 8a is performed at relatively short intervals. Therefore, in the present embodiment, the amount of $NO_X$ occluded in the $NO_X$—OR catalyst 11a is found and when the $NO_X$ amount exceeds the aforementioned maximum value, the exhaust gas air-fuel ratio of the exhaust gas flowing to the $NO_X$—OR catalyst 11a is temporarily made rich and the exhaust gas air-fuel ratio of the exhaust gas flowing to the three-way catalyst 8a is temporarily made lean.

Also, in the present embodiment, the first cylinder group 1a performs the rich operation to make the exhaust gas air-fuel ratio of the exhaust gas flowing to the three-way catalyst 8a rich, and performs the lean operation to make the exhaust gas air-fuel ratio of the exhaust gas flowing to the three-way catalyst 8a lean. Further, the second cylinder group 1b performs the rich operation to make the exhaust gas air-fuel ratio of the exhaust gas flowing to the $NO_X$—OR catalyst 11a rich, and performs the lean operation to make the exhaust gas air-fuel ratio of the exhaust gas flowing to the $NO_X$—OR catalyst 11a lean. Namely, in the present embodiment, the first cylinder group 1a performs the rich operation and the second cylinder group 1b performs the lean operation. If the amount of $NO_X$ occluded in the $NO_X$—OR catalyst 11a exceeds the maximum value when the second cylinder group 1b performs the lean operation, the first cylinder group 1a performs the lean operation temporarily and the second cylinder group 1b performs the rich operation temporarily. Note that, when the second cylinder group 1b must perform the rich operation temporarily and the first cylinder group 1a must perform the lean operation temporarily, the target air-fuel ratio (A/F)T of each cylinder of the second cylinder group 1b may be made equal to the aforementioned rich air-fuel ratio (A/F)RR, and that of the cylinder of the first cylinder group 1a may be made equal to the aforementioned lean air-fuel ratio (A/F)LL.

The period during which the second cylinder group 1b performs the rich operation temporarily and the first cylinder group 1a performs the lean operation temporarily, may be set to any period. In the present embodiment, the second cylinder group 1b is made to resume the lean operation and the first cylinder group 1a is made to resume the rich operation in accordance with this, if the amount of $NO_X$ occluded in the $NO_X$—OR catalyst 11a decreases below a predetermined minimum value when the second cylinder group 1b is performing the rich operation.

It is difficult to directly find the amount of $NO_X$ occluded in the $NO_X$—OR catalyst 11a. Thus, in the present embodiment, the amount of $NO_X$ occluded in the $NO_X$—OR catalyst 11a is estimated from the amount of $NO_X$ flowing to the $NO_X$—OR catalyst 11a, i.e., the amount of $NO_X$ discharged from the second cylinder group 1b. Namely, the amount of the exhaust gas discharged from an engine per unit time increases as the engine speed N increases, and thus the amount of $NO_X$ flowing to the $NO_X$—OR catalyst 11a per unit time as the engine speed N increases. As the engine load Q/N increases, the amount of the exhaust gas discharged from the engine increases and the combustion temperature is raised, and thus the amount of the inflowing $NO_X$ increases.

Figure 9A:
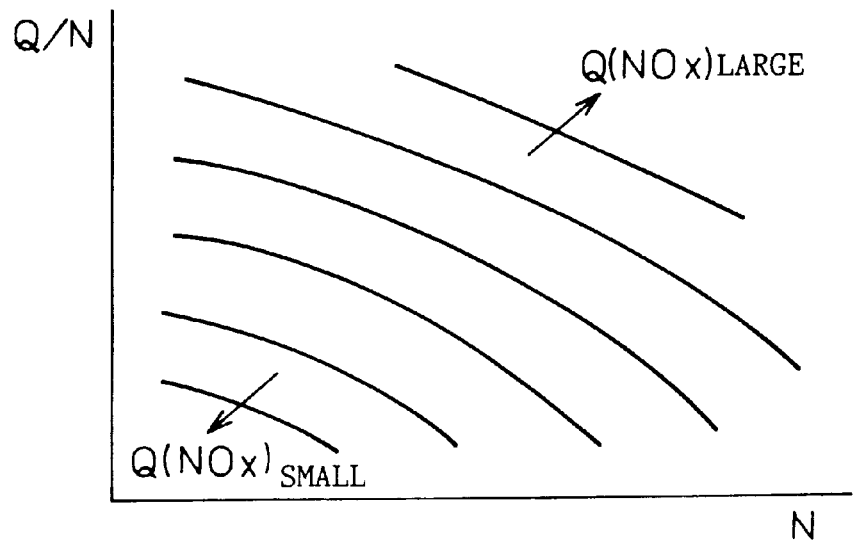
FIGS. 9A and 9B are diagrams showing an amount of $NO_X$ discharged from the second cylinder group per unit time.
Figure 9B:
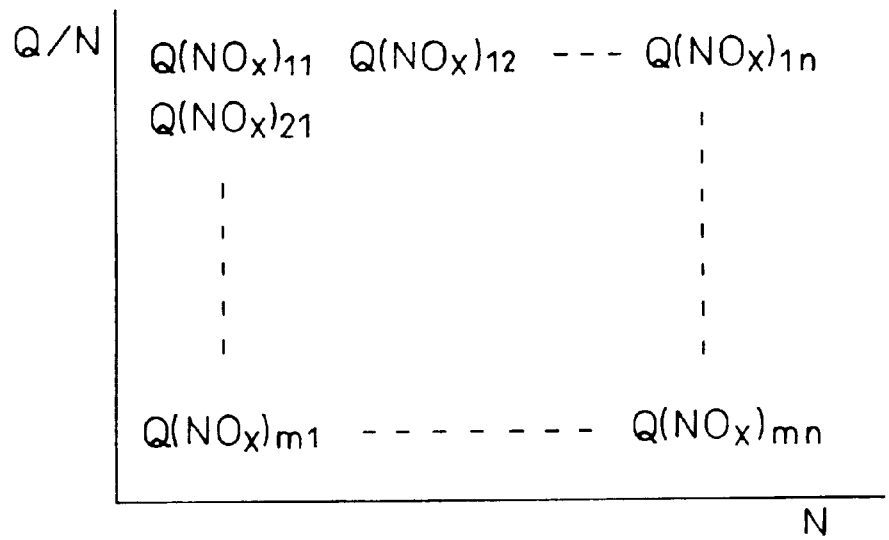

FIG. 9A shows the relationship, obtained by experiments, between the amount $Q(NO_X)$ of $NO_X$ discharged from the second cylinder group 1b per unit time, the engine load Q/N, and the engine speed N, with a constant lean air-fuel ratio (A/F)L. In FIG. 9A, each curve expresses an equal $NO_X$ amount. As shown in FIG. 9A, the amount $Q(NO_X)$ of $NO_X$ discharged from the second cylinder group 1b per unit time increases as the engine load Q/N increases and as the engine speed N increases. Note that the $NO_X$ amount $Q(NO_X)$ shown in FIG. 9A is stored in the ROM 22 in the form of a map shown in FIG. 9B.

Namely, when the second cylinder group 1b performs the lean operation, the amount $S(NO_X)$ of $NO_X$ occluded in the $NO_X$—OR catalyst 11a increased by $Q(NO_X)$ per unit time. Thus, the amount $S(NO_X)$ of $NO_X$ occluded in the $NO_X$—OR catalyst 11a when the second cylinder group 1b performs the lean operation is expressed by the following equation.

$$S(NO_X) = S(NO_X) + Q(NO_X) \cdot DELTAna$$

where DELTAna represents an interval of detection time of $Q(NO_X)$. Thus, $Q(NO_X) \cdot$ DELTAna represents the amount of $NO_X$ occluded in the $NO_X$—OR catalyst 11a from the previous processing routine to the present processing routine. If the $NO_X$ amount $S(NO_X)$ exceeds a predetermined maximum value $MAX(NO_X)$ when the second cylinder group 1b performs the lean operation and the first cylinder group 1a performs the rich operation, the second cylinder group 1b must perform the rich operation and the first cylinder group 1a must perform the lean operation.

Figure 10A:
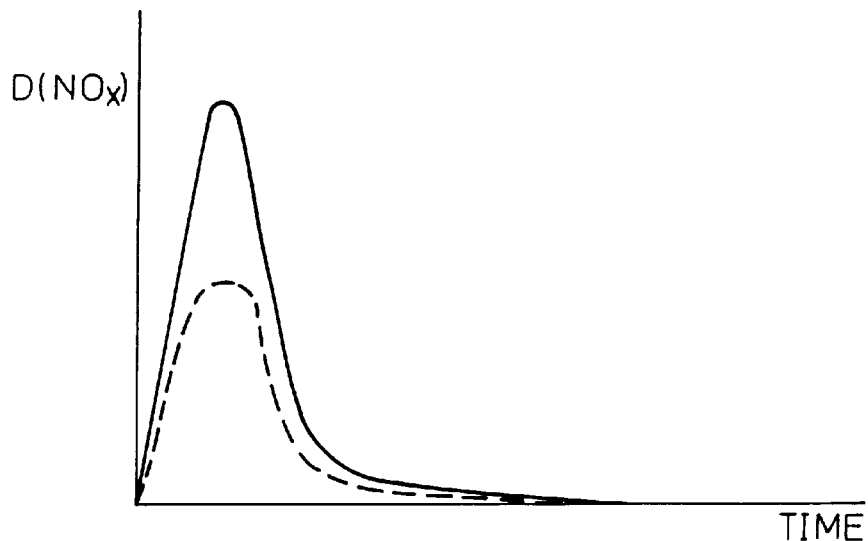
FIGS. 10A and 10B are diagrams showing an amount of $NO_X$ released from a $NO_X$ occluding and reducing catalyst per unit time.
Figure 10B:
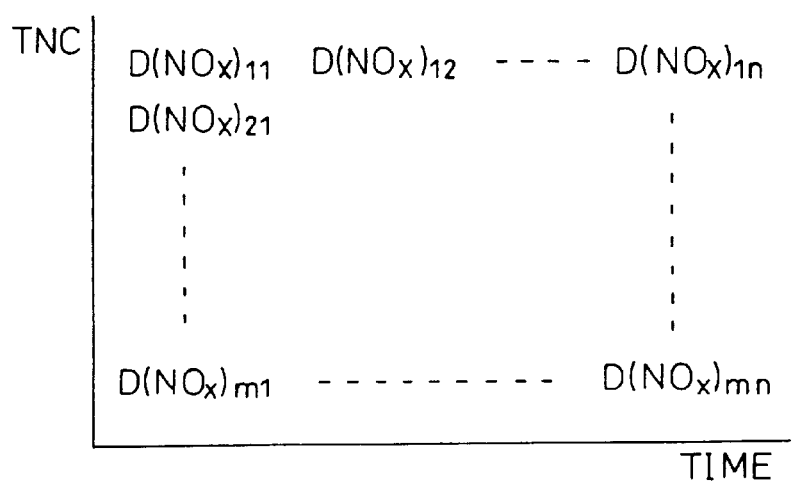

On the other hand, FIG. 10A shows an amount $D(NO_X)$ of $NO_X$ discharged from the $NO_X$—OR catalyst 11a per unit time, which is obtained by experiments. In FIG. 10A, the solid line represents a state where the temperature of the $NO_X$—OR catalyst 11a is high, and the broken line represents a state where the temperature of the $NO_X$—OR catalyst 11a is low. In FIG. 10A, TIME represents time from when the rich operation time TR was started, i.e., from when the target air-fuel ratio (A/F)T was changed from the lean air-fuel ratio (A/F)L to the rich air-fuel ratio (A/F)R. As the temperature of the $NO_X$—OR catalyst 11a is higher, the decomposition rate of $NO_X$ in the $NO_X$—OR catalyst 11a increases. Thus, as shown by the solid line in FIG. 10A, when the temperature of the $NO_X$—OR catalyst 11a is high, i.e., when a temperature TNC of the exhaust gas flowing to the $NO_X$—OR catalyst 11a is high, a large amount of $NO_X$ is released from the $NO_X$—OR catalyst 11a before the exhaust gas air-fuel ratio of the exhaust gas on the surface of the $NO_X$—OR catalyst 11a becomes sufficiently rich. As shown by the broken line in FIG. 10A, when the temperature of the $NO_X$—OR catalyst 11a is low, i.e., when the temperature TNC is low, a small amount of $NO_X$ is released from the $NO_X$—OR catalyst 11a. In other words, as the exhaust gas temperature TNC becomes higher, the amount $D(NO_X)$ of $NO_X$ released from the $NO_X$—OR catalyst 11a increases. The $NO_X$ amount $D(NO_X)$ is previously stored as a function of the exhaust gas temperature TNC and the time TIME in the ROM 22 in the form of the map shown in FIG. 10B.

The temperature TNC of the exhaust gas flowing to the $NO_X$—OR catalyst 11a may be determined by a sensor, for example. However, in the present embodiment, the temperature TNC of the exhaust gas flowing to the $NO_X$—OR catalyst 11a is estimated from the engine operating condition, i.e., the engine load Q/N and the engine speed N. Namely, TNC is previously obtained by experiments, and stored in the ROM 22 in the form of a map shown in FIG. 11.

Note that the amount $Q(NO_X)$ of $NO_X$ discharged from the second cylinder group 1b per unit time varies in accordance with the engine air-fuel ratio. Thus, if the lean air-fuel ratio (A/F)L is made to change, for example, in accordance with the engine operating condition, it is necessary to correct $Q(NO_X)$ obtained from the map shown in FIG. 9B in accordance with the lean air-fuel ratio (A/F)L. Alternatively, it is necessary to find $Q(NO_X)$ using a map expressing the relationships between the lean air-fuel ratio (A/F)L and the amount $Q(NO_X)$.

Namely, when the second cylinder group 1b performs the rich operation, the amount $S(NO_X)$ of $NO_X$ occluded in the $NO_X$—OR catalyst 11a is reduced by $D(NO_X)$ per unit time. Thus, when the second cylinder group 1b performs the rich operation, the amount $S(NO_X)$ of $NO_X$ occluded in the $NO_X$—OR catalyst 11a is expressed by the following equation.

$$S(NO_X)=S(NO_X)-D(NO_X)\cdot DELTAnd$$

where DELTAnd represents an interval of detection time of $D(NO_X)$. Thus, $Q(NO_X)$- DELTAnd represents an amount of $NO_X$ released from the $NO_X$—OR catalyst 11a in a period from the previous processing routine to the present processing routine. If the $NO_X$ amount $S(NO_X)$ becomes lower than a predetermined minimum value $MIN(NO_X)$ when the second cylinder group 1b performs the rich operation and the first cylinder group 1a performs the lean operation, the second cylinder group 1b must performs the lean operation and the first cylinder group 1a must performs the rich operation.

Figure 12:
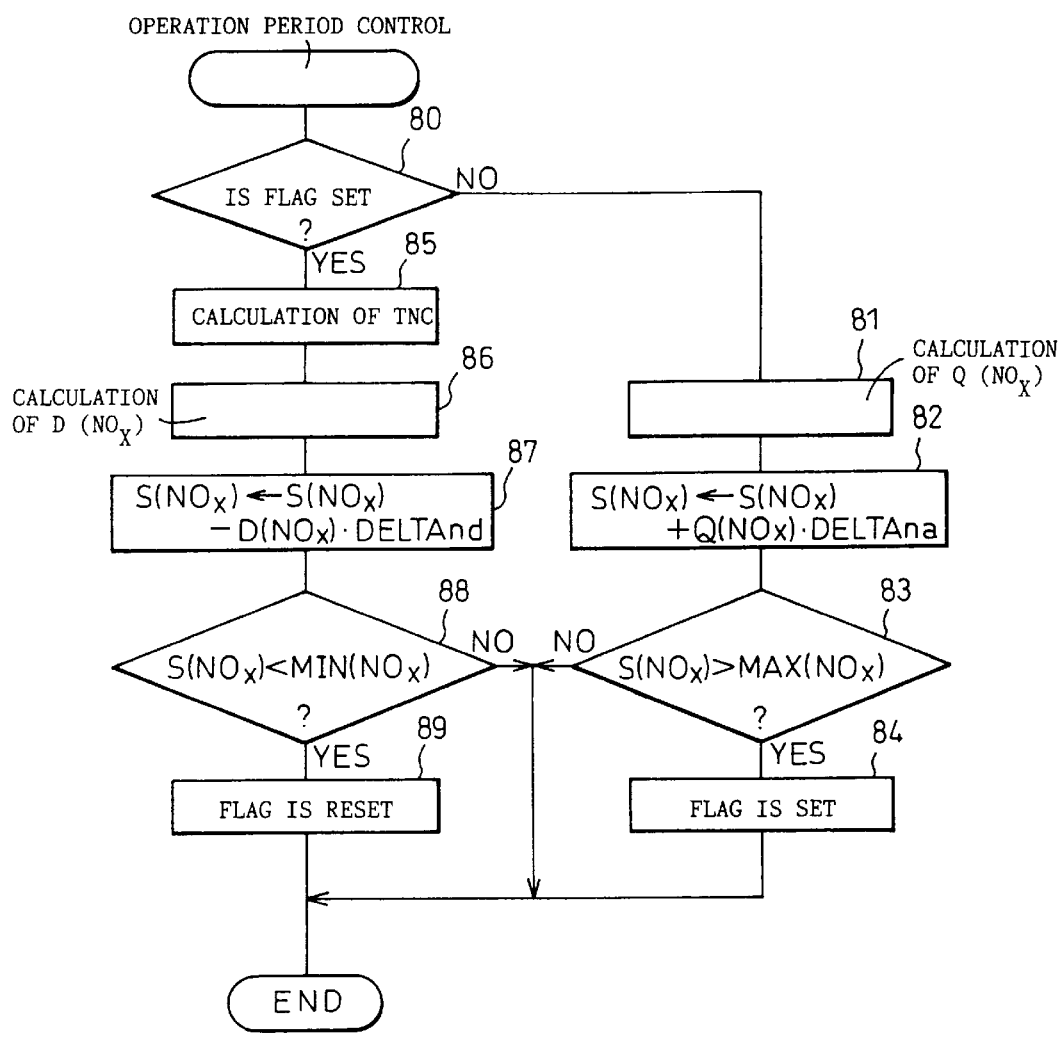
FIG. 12 is a flowchart for executing the operation control according to another embodiment.

FIG. 12 shows an operation control routine according to the embodiment mentioned above. This routine is executed by interruption every predetermined time.

Referring to FIG. 12, first, in step 80, it is judged whether the flag is set which is set when the first cylinder group 1a must perform the lean operation and the second cylinder group 1b must perform the rich operation to recover the catalytic activity of the three-way catalyst 8a. When the flag is reset, the routine goes to step 81, where $Q(NO_X)$ is calculated from the map shown in FIG. 9B. In the following step 82, the amount $S(NO_X)$ of the occluded $NO_X$ is calculated on the basis of the following equation.

$$S(NO_X)=S(NO_X)+Q(NO_X)\cdot DELTAna$$

where DELTAnd represents an interval of time from the previous processing cycle to the present processing cycle. In the following step 83, it is judged whether the $NO_X$ amount $S(NO_X)$ is larger than the maximum amount $MAX(NO_X)$ which is determined in accordance with the occluding capacity of the $NO_X$—OR catalyst 11a. When $S(NO_X)$-$MAX(NO_X)$, the processing cycle is ended. Namely, when $S(NO_X) \leq MAX(NO_X)$, it is judged that the $NO_X$ occluding capacity of the $NO_X$—OR catalyst 11a is still large, and the lean operation of the second cylinder group 1b the rich operation of the first cylinder group 1a are continued.

Contrarily, when $S(NO_X) > MAX(NO_X)$ in step 83, the routine goes to step 84, where the flag is set and then, the processing cycle is ended. Namely, when $S(NO_X) > MAX(NO_X)$, it is judged that the $NO_X$ occluding capacity of the $NO_X$—OR catalyst 11a becomes smaller, and thus the lean operation of the second cylinder group 1b is stopped and the rich operation is started. At this time, the rich operation of the first cylinder group 1a is stopped and the lean operation is started.

Figure 11:
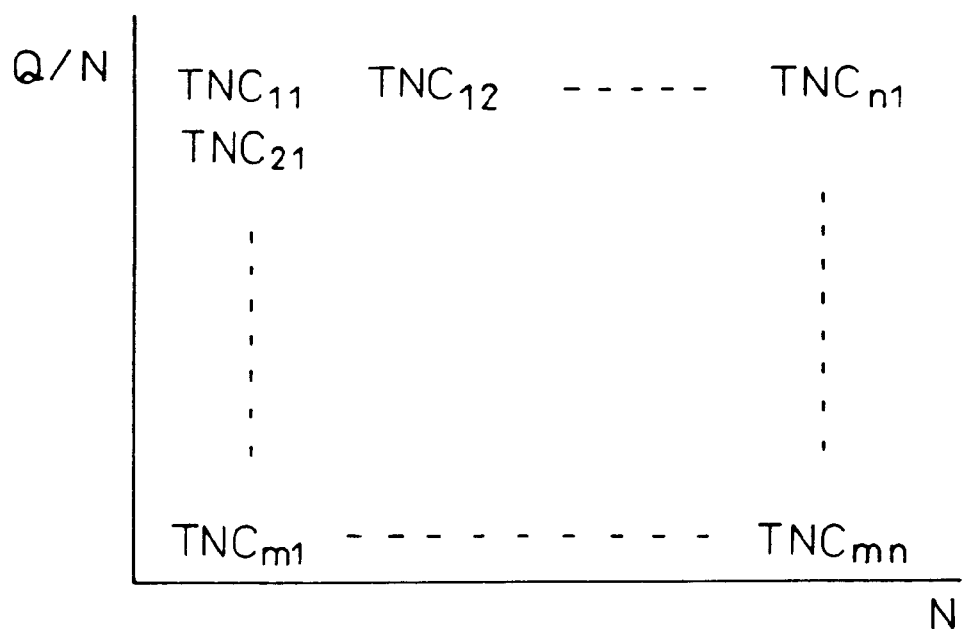
FIG. 11 is a diagram showing a temperature of the exhaust gas flowing to the $NO_X$ occluding and reducing catalyst.

When the flag is set, the routine goes from step 80 to step 85, where the exhaust gas temperature TNC is calculated from the map shown in FIG. 11. In the following step 86, $D(NO_X)$ is calculated from the map shown in FIG. 10B. In the following step 87, the amount $S(NO_X)$ of $NO_X$ occluded in the $NO_X$—OR catalyst 11a is calculated on the basis of the following equation.

$$S(NO_X)=S(NO_X)-D(NO_X)\cdot DELTAnd$$

where DELTAnd is an interval of time from the previous processing cycle to the present processing cycle. In the following step 88, it is judged whether the $NO_X$ amount $S(NO_X)$ is smaller than the minimum value $MIN(NO_X)$. When $S(NO_X) \geq MIN(NO_X)$, the processing cycle is ended. Namely, when $S(NO_X) \geq MIN(NO_X)$, it is judged that the occluding capacity of the $NO_X$—OR catalyst 11a does not become sufficiently large, and the rich operation of the second cylinder group 1b and the lean operation of the first cylinder group 1a are continued.

Contrarily, when $S(NO_X) < MIN(NO_X)$ in step 88, the routine goes to step 89, where the flag is reset, and then the processing cycle is ended. Namely, when $S(NO_X) < MIN(NO_X)$, it is judged that the occluding capacity of the NO$_X$—OR catalyst 11a becomes sufficiently large, and the rich operation of the second cylinder group 1b is stopped and the lean operation is started. At this time, the lean operation of the first cylinder group 1a is stopped and the rich operation is started. In the routine shown in FIG. 8, the fuel injection time TAU is calculated on the basis of whether the flag controlled in the routine shown in FIG. 12 is set or reset.

In the embodiment explained referring to FIGS. 1 to 7, the amount S(HC) of cumulative HC flowing to the three-way catalyst 8a is found, and the operating conditions of the first and second cylinder groups 1a and 1b are changed in accordance with the S(HC). Namely, the operating condition of the first cylinder group 1a is changed from the rich operation to the lean operation, and that of the second cylinder group 1b is changed from the lean operation to the rich operation. In the embodiment explained referring to FIGS. 8 to 12, the amount S(NO$_X$) of NO$_X$ occluded in the NO$_X$—OR catalyst 11a is found, and the operating conditions of the first and second cylinder groups 1a and 1b are changed in accordance with the S(NO$_X$). Alternatively, both of the cumulative amount S(HC) of HC flowing to the three-way catalyst 8a and the amount S(NO$_X$) of NO$_X$ occluded in the NO$_X$—OR catalyst 11a are found, and the operating conditions of the first and second cylinder groups 1a and 1b may be changed in accordance with one of S(HC) and S(NO$_X$). In this case, the operating conditions of the first and second cylinder groups 1a and 1b may be changed when S(HC) becomes larger than the tolerable maximum value TM, or when S(NO$_X$) becomes larger than the maximum value MAX. Further, alternatively, the operating conditions of the first and second cylinder groups 1a and 1b may be changed in accordance with the characteristics, material, or capacity of each catalyst or occlusive material, or the exhaust gas air-fuel ratio of the inflowing exhaust gas or the flow rate thereof.

Further, the tolerable maximum value TM for the cumulative HC amount S(HC), and the maximum value MAX and the minimum value MIN for the occluded NO$_X$ amount S(NO$_X$) may be changed in accordance with the characteristic, material, or capacity, of each catalyst or occlusive material, or the exhaust gas air-fuel ratio of the inflowing exhaust gas or the flow rate thereof, or the engine operating condition. In the embodiments described above, the first cylinder group 1a is comprised of single cylinder, and the second cylinder group 1b is comprised of three cylinders. Alternatively, the first cylinder group 1a may be comprised of a plurality of cylinders, and the second cylinder group 1b may be comprised of single cylinder. However, it is desirable to reduce the rate of fuel consumption as much as possible. Thus, it is preferable that the number of cylinders of the second cylinder group 1b, which basically perform the lean operation, is as large as possible. Note that, in a case where the first cylinder group 1a is comprised of a plurality of cylinders, the target control values (A/F)T of the engine air-fuel ratio of all cylinders of the first cylinder group 1a are made common to each cylinder.

We claim:

1. A device for purifying an exhaust gas of an internal combustion engine having a plurality of cylinders divided into first and second cylinder groups, and first and second exhaust passages connected to the first and the second cylinder groups, respectively, the device comprising:

an NH$_3$ synthesizing catalyst arranged in the first exhaust passage, the NH$_3$ synthesizing catalyst synthesizing NH$_3$ from at least of a part NO$_X$ in an inflowing exhaust gas when an exhaust gas air-fuel ratio of the inflowing exhaust gas is rich;

first making-rich means for making the exhaust gas air-fuel ratio of the exhaust gas flowing into the NH$_3$ synthesizing catalyst rich to synthesize NH$_3$;

an interconnecting exhaust passage interconnecting the first passage downstream of the NH$_3$ synthesizing catalyst and the second exhaust passage to contact NH$_3$ synthesized in the NH$_3$ synthesizing catalyst and NO$_X$ from the second exhaust passage to each other, to reduce the NO$_X$ by the NH$_3$; and first making-lean means for making the exhaust gas air-fuel ratio of the exhaust gas flowing into the NH$_3$ synthesizing catalyst temporarily lean; wherein a cumulative amount of hydrocarbon (HC) flowing to the NH$_3$ synthesizing catalyst when the exhaust gas air-fuel ratio of the exhaust gas flowing to the NH$_3$ synthesizing catalyst is rich is obtained, and wherein the first making-lean means performs the making-lean operation when the cumulative amount of HC becomes larger than a predetermined upper threshold.

2. A device according to claim 1, further comprising a second engine air-fuel ratio control means for controlling the engine air-fuel ratio of the second cylinder group, wherein the second engine air-fuel ratio control means makes the engine air-fuel ratio of the second cylinder group lean.

3. A device according to claim 2, further comprising a NO$_X$ occluding and reducing (NO$_X$—OR) catalyst arranged in the second exhaust passage, the NO$_X$—OR catalyst occluding NO$_X$ therein when the exhaust gas air-fuel ratio of the inflowing exhaust gas is lean, and releasing the occluded NO$_X$ therefrom and reducing the NO$_X$ when the exhaust gas air-fuel ratio of the inflowing exhaust gas is rich, and a second making-rich means for making the exhaust gas air-fuel ratio of the exhaust gas flowing to the NO$_X$—OR catalyst temporarily rich, to release the occluded NO$_X$ from the NO$_X$—OR catalyst, wherein the first making-lean means performs the making-lean operation when the second making-rich means performs the making-rich operation.

4. A device according to claim 3, further comprising an estimating means for estimating an amount of NO$_X$ occluded in the NO$_X$—OR catalyst, wherein the second making-rich means performs the making-rich operation when the estimated NO$_X$ amount becomes larger than another predetermined upper threshold.

5. A device according to claim 3, wherein the second making-rich means stops the making-rich operation when the estimated NO$_X$ amount becomes smaller than another predetermined lower threshold.

6. A device according to claim 3, wherein the second making-rich means controls the exhaust gas air-fuel ratio of the exhaust gas flowing to the NO$_X$—OR catalyst by controlling the second engine air-fuel ratio control means.

7. A device according to claim 3, wherein the NO$_X$—OR catalyst includes: at least one substance selected from alkali metals comprising potassium, sodium, lithium, and cesium, alkali earth metals comprising barium and calcium, rare earth metals comprising lanthanum and yttrium; and precious metals comprising palladium, platinum, and rhodium.

8. A device according to claim 1, further comprising a first engine air-fuel ratio control means for controlling the engine air-fuel ratio of the first cylinder group, wherein at least one of the first making-rich means and the first making-lean means controls the first engine air-fuel ratio control means to make the exhaust gas air-fuel ratio of the exhaust gas flowing to the NH$_3$ synthesizing catalyst rich or lean.

9. A device according to claim 1, wherein the NH$_3$ synthesizing catalyst is a three-way catalyst including at least one of precious metals comprising palladium, platinum, and rhodium.

10. A device according to claim 1, wherein the making-lean means makes the exhaust gas air-fuel ratio of the exhaust gas flowing to the $NH_3$ synthesizing catalyst lean for a predetermined period.

11. A device according to claim 1, further comprising an exhaust gas purifying catalyst arranged in the interconnecting passage for purifying $NH_3$ and $NO_X$ in the inflowing exhaust gas.

12. A device according to claim 11, wherein the exhaust gas purifying catalyst includes a transition metal comprising copper, chrome, vanadium, titanium, iron, nickel, and cobalt, or a precious metal comprising platinum, palladium, rhodium, and iridium.

13. A device according to claim 1, further comprising determining means for determining the cumulative amount of HC flowing to the $NH_3$ synthesizing catalyst when the exhaust gas air-fuel ratio of the exhaust gas flowing to the $NH_3$ synthesizing catalyst is rich and for determining that a catalytic activity of the $NH_3$ synthesizing catalyst has become lower than a tolerable value when the cumulative amount of HC becomes larger than the predetermined upper threshold.

* * * * *